United States Patent
Wen et al.

(10) Patent No.: US 12,293,419 B2
(45) Date of Patent: May 6, 2025

(54) CONNECTED ACCOUNTING SYSTEM AND USER INTERFACES

(71) Applicant: Tallyfor, Inc., San Francisco, CA (US)

(72) Inventors: Benson Wen, San Francisco, CA (US); Peter Wen, San Francisco, CA (US)

(73) Assignee: Tallyfor, Inc., San Francisco, CA (US)

( * ) Notice: Subject to any disclaimer, the term of this patent is extended or adjusted under 35 U.S.C. 154(b) by 0 days.

(21) Appl. No.: 17/871,466

(22) Filed: Jul. 22, 2022

(65) Prior Publication Data

US 2023/0022438 A1    Jan. 26, 2023

Related U.S. Application Data

(60) Provisional application No. 63/225,113, filed on Jul. 23, 2021.

(51) Int. Cl.
*G06Q 40/12*     (2023.01)
*G06F 16/22*     (2019.01)
*G06F 16/28*     (2019.01)

(52) U.S. Cl.
CPC .........  *G06Q 40/12* (2013.12); *G06F 16/2246* (2019.01); *G06F 16/282* (2019.01)

(58) Field of Classification Search
None
See application file for complete search history.

(56) References Cited

U.S. PATENT DOCUMENTS

| | | | |
|---|---|---|---|
| 2003/0037173 A1* | 2/2003 | Pace | H04L 67/34 719/310 |
| 2003/0051236 A1* | 3/2003 | Pace | H04L 63/12 717/177 |
| 2004/0236655 A1* | 11/2004 | Scumniotales | G06Q 10/0637 707/999.1 |
| 2006/0161485 A1 | 7/2006 | Meldahl | |
| 2006/0167771 A1* | 7/2006 | Meldahl | G06Q 40/06 705/30 |
| 2008/0120129 A1* | 5/2008 | Seubert | G06Q 40/125 705/305 |
| 2021/0073693 A1* | 3/2021 | Vij | G06F 40/284 |

OTHER PUBLICATIONS

PCT International Search Report and Written Opinion; Application No. PCT/US2022/038033 Tallyfor, Inc., International filing date of Jul. 22, 2022, date of mailing Nov. 30, 2022, 10 pages.

* cited by examiner

*Primary Examiner* — Fateh M Obaid
(74) *Attorney, Agent, or Firm* — Patent Law Works LLP

(57) ABSTRACT

A method and system for determining a set of accounting data structure (ADS) chains including a first ADS chain, a second ADS chain, a third ADS chain, and a fourth ADS chain; determining a first connection data structure (CDS); determining a second CDS; determining a set of mutually exclusive partitions including a first partition and a second partition, wherein the first partition and second partition are mutually exclusive in that no CDS links an ODS in an ADS chain associated with the first partition to an ODS in an ADS chain associated with the second partition; assigning the first partition to a first set of computational resources; and assigning the second partition to a second set of computational resources are described.

20 Claims, 22 Drawing Sheets

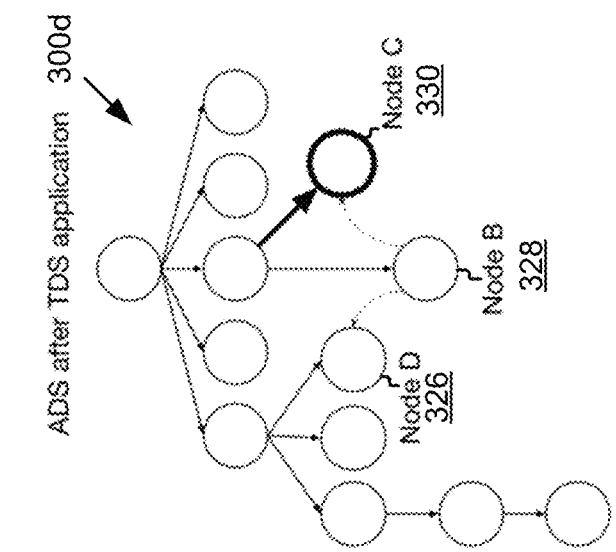
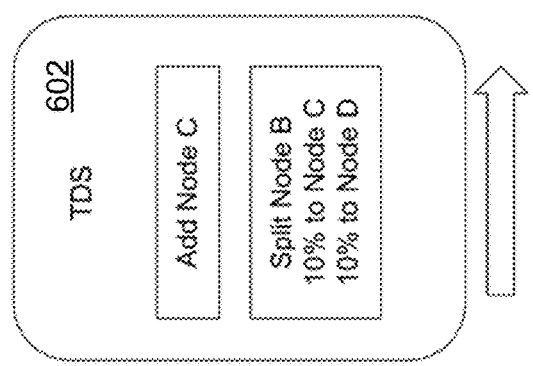
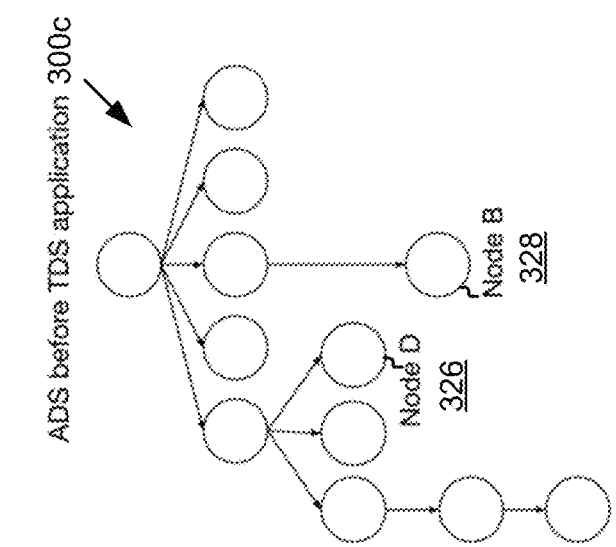
Figure 6

CONNECTED ACCOUNTING SYSTEM AND USER INTERFACES

BACKGROUND

The present disclosure relates to a connected accounting system (CAS). In particular, the present disclosure relates a connected accounting system that allows a more computationally efficient; lower complexity; more amenable to analysis and validation; larger-scale; cross-organizational technique for managing accounting information than existing techniques.

Accounting Data is normally kept at individual companies and organizations. One problem with existing accounting systems is that the data is siloed by entity or specific company. It is often difficult or impossible and/or inefficient to get combined accounting data for different entities in one system and using one interface.

SUMMARY

The present disclosure relates to a connected account system. According to one aspect of the subject matter described in this disclosure, a computer-implemented method includes determining, using one or more processors, a set of accounting data structure (ADS) chains including a first ADS chain, a second ADS chain, a third ADS chain, and a fourth ADS chain; determining, using the one or more processors, a first connection data structure (CDS), the first CDS comprising shared instances of an ODS across a first plurality of ADS chains including: a first operation data structure (ODS) associated with a first ADS chain and a second ODS associated with the second ADS chain, wherein the first ODS and second ODS are two instances describing one or more related operations that involve the first ADS chain and the second ADS chain; determining, using the one or more processors, a second CDS, the second CDS comprising shared instances of an ODS across a second plurality of ADS chains including: a third ODS associated with a third ADS chain and a fourth ODS associated with a fourth ADS chain, wherein the third ODS and the fourth ODS are two instances describing one or more related operations that involve the third ADS chain and the fourth ADS chain; determining, using the one or more processors, a set of mutually exclusive partitions including a first partition and a second partition, wherein the first ADS chain, the second ADS chain, and the first CDS are associated with the first partition, wherein the third ADS chain, the fourth ADS chain, and the second CDS are associated with the second partition, wherein the first partition and second partition are mutually exclusive in that no CDS links an ODS in an ADS chain associated with the first partition to an ODS in an ADS chain associated with the second partition; assigning, using the one or more processors, the first partition to a first set of computational resources; and assigning, using the one or more processors, the second partition to a second set of computational resources.

Other implementations of one or more of these aspects include corresponding systems, apparatus, and computer programs, configured to perform the actions of the methods, encoded on computer storage devices.

These and other implementations may each optionally include one or more of the following features. For instance, the features further include the first ADS chain includes a first ADS and a second ADS, wherein the first ADS and second ADS are hierarchical tree structures. For instance, the features further include: generating the first ADS, wherein the first ADS is a hierarchical tree structure, and generating the first ADS includes: receiving account information associated with an entity; adding a root node associated with an entity to the first ADS; adding a set of first tier nodes to the first ADS, wherein each of the first tier nodes is associated with a group node selected from income, expenses, assets, liabilities, and equity; and when one or more account sub-group are present, adding a set of second tier nodes to the first ADS, wherein each second tier node is associated with a sub-group of account under the respective first tier node's associated group. For instance, the features further include that each node in the first ADS is associated with a value and a sum of the leaf nodes in the first ADS, when the first ADS is balanced, is equal to zero. For instance, the features further include that the first ODS is applied to the first ADS and results in the second ADS, the first ODS changing one or more of a node and data associated with a node in the first ADS and the first ODS is associated with a financial transaction involving an entity associated with the first ADS chain and an entity associated with the second ADS chain. For instance, the features further include applying a transformation data structure (TDS) to the second ADS; and outputting, responsive to application of the TDS to the second ADS, one or more of a third ADS and a report. For instance, the features further include that the TDS is associated with a closing and invokes one or more PDSes. For instance, the features further include generating a parameter data structure (PDS) stream including one or more parameter data structures, the first CDS and the second CDS further including at least one PDS from the PDS stream. For instance, the features further include that a first PDS in the PDS stream represents one or more of time, a tax rate, a tax table, tax calculations, transaction fees or other published prices, and a currency exchange rate. For instance, the features further include that the second ADS chain comprises a first, virtual ADS and a second, virtual ADS, the first virtual ADS generated responsive to a determination that an ADS associated with a second entity is not accessible or does not already exist, the second ODS applied to the first, virtual ADS thereby generating the second, virtual ADS.

BRIEF DESCRIPTION OF THE DRAWINGS

The techniques introduced herein are illustrated by way of example, and not by way of limitation in the figures of the accompanying drawings in which like reference numerals are used to refer to similar elements.

FIG. 6 is diagram illustrating an example of a Transform Data Structure (TDS) ADS transformation in accordance with some implementations.

DETAILED DESCRIPTION

The present disclosure describes systems and methods for a connected accounting system (CAS) 220. The CAS 220 may represent a universal balance of all accounts across all time for all organizations (adopting the CAS 220) and a way to incrementally capture related data in a useful way or one or more partition/fraction of the universal balance; of time(s); of organization(s). The low-level components of the CAS 220 may individually, or in combination, beneficially improve accuracy, logical reasoning, manageability, observability, and auditability. The components of the CAS may individually or in combination, further minimize and help detect errors accounting and/or bookkeeping processes and associated outputs. Further, the higher-level macro portion(s) of the CAS 220 may capture relationships among business, government, and non-profit entities in new and powerful ways, acting as a global universal double-entry balance, improving analytics, decision making, and understanding.

The CAS 220 of the present disclosure is particularly advantageous in one or more of the following respects, which are discussed further below:

Data organization in Accounting Data Structure (ADS) trees instead of tables;
Chaining of ADS trees over time or over any parameter like divisions of a company; rental properties; multi-national entities, etc. (just some examples);
Operation data structure (ODS) and its use as a stream of changes;
CDS Sync across ADSes to create a distributed transaction tracking system;
Virtual ADS to capture uncertainty;
Use of Virtual ADS for incremental discovery;
Parameter Data Structures (PDS) including time;
Forking of ADSes;
Partitioning;
Backtracking risk/resolution; and
Synchronization.

Figure 1:
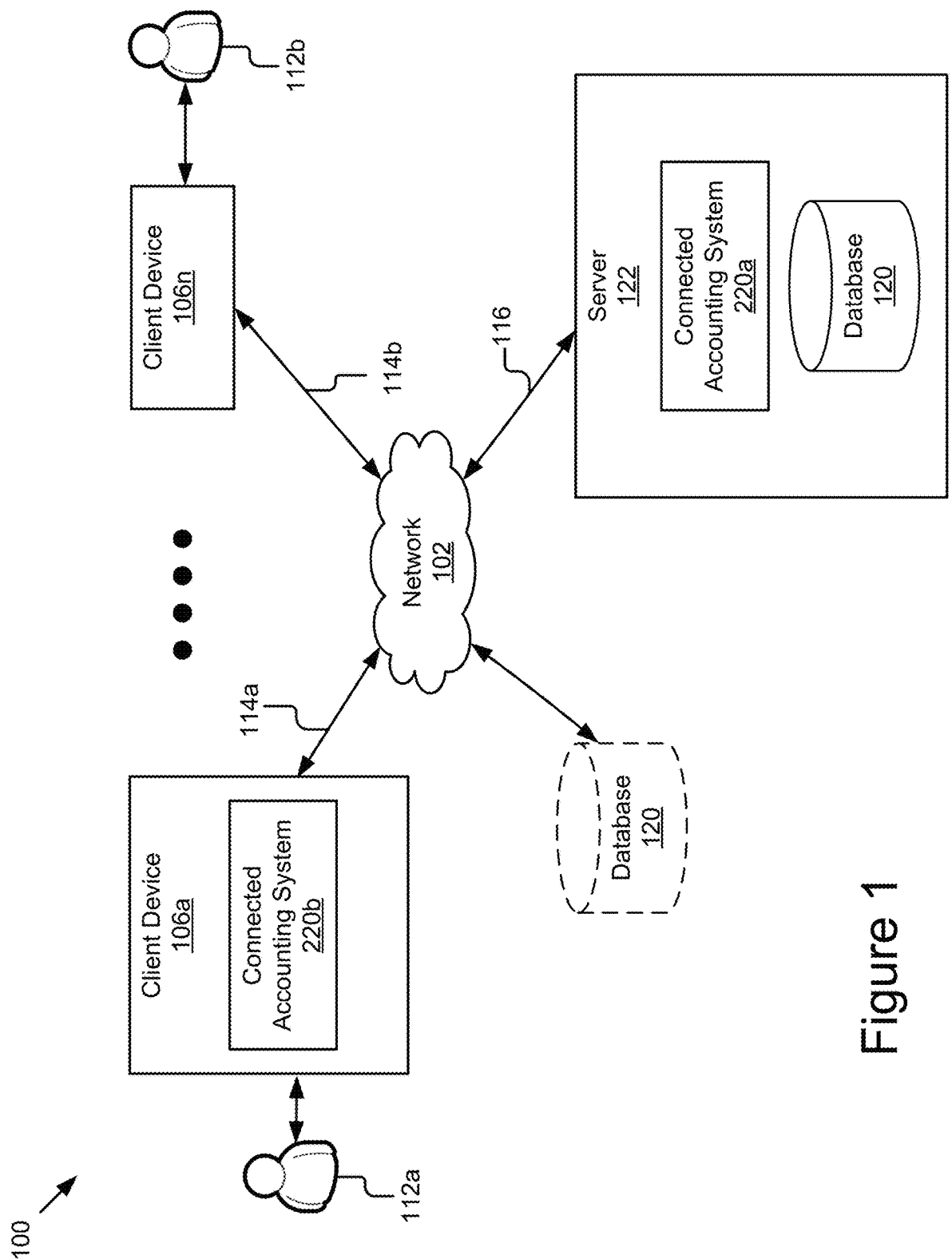
FIG. 1 is a high-level block diagram illustrating an example connected accounting system in accordance with some implementations.

FIG. 1 is a block diagram illustrating an example system 100 including the connected accounting system 220. As illustrated, the system 100 may include a server 122 and one or more client devices 106*a* . . . 106*n*, which connect, or communicatively couple, with each other via a network 102.

The network 102 includes hardware, software, and/or firmware that provide communications between the cloud server 122 and the client devices 106*a* . . . 106*n*. In some implementations, the network 102 may be a conventional type, wired and/or wireless, and may have numerous different configurations including a star configuration, token ring configuration, or other configurations. For instance, the network 102 may include one or more local area networks (LAN), wide area networks (WAN) (e.g., the Internet), satellite networks, telephone or cable networks, cellular networks, public networks, private networks, virtual networks, peer-to-peer networks, wireless networks implemented using a wireless protocol such as WiFi® or WiMax®, and/or any other interconnected data paths across which multiple devices may communicate. Although FIG. 1 illustrates a single block for the network 102, it should be understood that the network 102 may in practice comprise any number of combinations of networks, as noted above.

The client devices 106*a* . . . 106*n* respectively accessed by users 112*a* . . . 112*n*, or collectively referred hereafter as client device 106 accessed by user 112, is a computing device including a processor, a memory, applications, a database, and network communication capabilities. In some implementations, the client devices 106*a* . . . 106*n* themselves may be cloud servers or non-cloud servers; they may be other connected accounting system 220 servers as peers, which in and of themselves be connected to other devices 106*a* . . . 106*n*. For example, the client device 106 may be a laptop computer, a desktop computer, a tablet computer, a mobile telephone, a personal digital assistant (PDA), a mobile email device, a television with one or more processors embedded therein or coupled thereto or any other electronic device capable of accessing the network 102 and communicating with other entities of the system 100.

The client device 106 receives and sends data to and from the user 112 accessing the client device 106. For example, the client device 106 may receive a content request from the user 112 via a browser resident on the client device 106 and communicate with the server 122 to process the content request and send the content for display on the client device 106. The client device 106 may also allow a user to exchange and share content with other users through one or more applications installed on the client device 106. As illustrated in FIG. 1, in some implementations, the connected accounting system 220*b* may be operational and software on the client device 106*a*.

The server 122 includes hardware, software, and/or firmware that assist and facilitate the cooperation initiated on the client device 106. In some implementations, the server 122 is a cloud server. The server 122 may be one of a variety of types of computing devices, for example, a physical server, a virtual server, a desktop computer, and the like. In some implementations, the server 122 includes the CAS 220*a*, and the CAS 220*a* is operational on the server 122. One example of the server 122 including the CAS 220*a* will be described below with reference to FIG. 2. It should be understood that in one implementation, the CAS 220a operates as a cloud service and is operational on the server 122. In another implementation, the CAS 220b operates as an application on any client device 106, for example, client device 106a as shown in FIG. 1. In yet another implementation, CAS 220a and CAS 220b cooperate with each other over the network 102 with the functionality and processing described below distributed between CAS 220a and the CAS 220b, for example as peer-to-peer computing.

Figure 2:
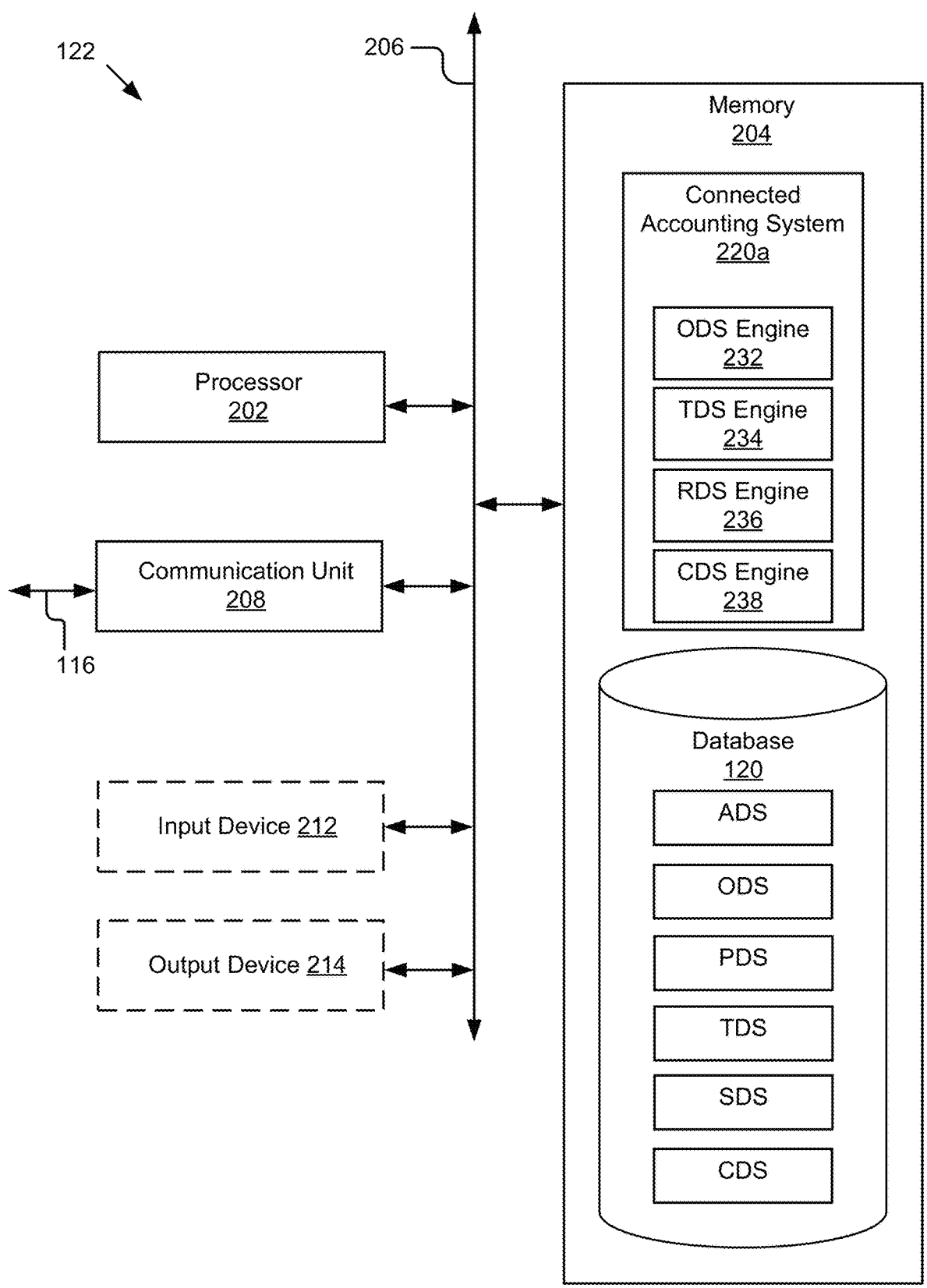
FIG. 2 is a high-level block diagram illustrating an example server including the connected accounting system in accordance with some implementations.

FIG. 2 is a block diagram that illustrates an example server 122 in accordance with some implementations. As illustrated, the server 122 may include the CAS 220, a processor 202, a memory 204, an optional input device 212, an optional output device 214, a communication unit 208, a database 120, which may be communicatively coupled by a communication bus 206. The components in the figure are provided merely for illustrative purpose, but not as a limitation. More, fewer, or other components may be applicable and contemplated. In some implementations, the database 120 may store the various instances of ADSes, ODSes, PDSes, TDSes, and SDSes, which are described and used by the CAS 220 as described below.

As used in this present disclosure, the terms "system" and "component" are intended to refer to a computer-related entity, either hardware, a combination of hardware and software, software, or software in execution. For example, a component can be, but is not limited to, a process running on a processor, a hard disk drive, multiple storage drives (of optical and/or magnetic and/or solid-state storage medium), an object, an executable, a thread of execution, a program, and/or a computer. By way of illustration, both an application running on a server and the server itself can be a component. One or more components may reside within a process and/or thread of execution, and a component may be localized on one computer and/or distributed between two or more computers. Further, components may be communicatively coupled to each other by various types of communications media to coordinate operations. The coordination may involve the unidirectional or bi-directional exchange of information. For instance, the components may communicate information in the form of signals communicated over the communications media. The information may be implemented as signals allocated to various signal lines. In such allocations, each message is a signal. Further implementations, however, may alternatively employ data messages. Such data messages may be sent across various connections. Example connections include, but are not limited to, parallel interfaces, serial interfaces, and bus interfaces.

The processor 202 comprises an arithmetic logic unit, a microprocessor, a general-purpose controller or some other processor array to perform computations and provide electronic display signals to a display device and/or to and from the bus 206. The processor 202 may be coupled to the bus 206 for communication with the other components. The processor 202 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability might be enough to perform complex tasks, including various types of feature extraction and matching. It will be obvious to one skilled in the art that other processors, operating systems, sensors, displays and physical configurations are possible.

The memory 204 stores instructions and/or data that may be executed by processor 202. The memory 204 is coupled to the bus 206 for communication with the other components. The instructions and/or data may comprise code for performing any and/or all of the techniques described herein, e.g., those described herein with reference to the CAS 220 and its subcomponents. The memory 204 may be a dynamic random-access memory (DRAM) device, a static random-access memory (SRAM) device, flash memory or some other memory device known in the art. In some implementations, the memory 204 also includes a non-volatile memory or similar permanent storage device and media such as a hard disk drive, a floppy disk drive, a CD ROM device, a DVD ROM device, a DVD RAM device, a DVD RW device, a flash memory device, or some other mass storage device known in the art for storing information on a more permanent basis. In some implementations, the CAS 220 is stored in the memory 204 and executed by the processor 202 to perform the features and functionality described herein. In some implementations, the CAS 220, one or more of its subcomponents 232, 234, 236, and 238, and the database 120 are communicatively coupled to perform the features and functionalities described herein.

The communication unit 208 may include one or more interface devices (I/F) for wired and wireless connectivity among the components of the system 100. For instance, the communication unit 208 may include, but is not limited to, various types of known connectivity and interface options. The communication unit 208 may be coupled to the other components of the server 122 via the bus 206. The communication unit 208 can provide other connections to the network 102 vial signal line 116 and to other entities of the system 100 using various standard communication protocols.

In some implementations, the communication unit 208 includes a wireless transceiver for exchanging data with the server 122 or any other communication channel using one or more wireless communication methods, such as IEEE 802.11, IEEE 802.16, BLUETOOTH® or another suitable wireless communication method.

In some implementations, the communication unit 208 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In some implementations, the communication unit 208 includes a wired port and a wireless transceiver. The communication unit 208 also provides other conventional connections to the network for distribution of files and/or media objects using standard network protocols such as TCP/IP, HTTP, HTTPS and SMTP as will be understood to those skilled in the art.

The database 120 may include information sources for storing and providing access to data. In some implementations, the database 120 may store data associated with a database management system (DBMS) operable on the system 100. For example, the DBMS could include a structured query language (SQL) DBMS, a NoSQL DBMS, various combinations thereof, etc. In some instances, the DBMS may store data in multi-dimensional structures including, but not limited to, tables comprised of rows and columns, and manipulate, (e.g., insert, query, update and/or delete), aggregations of data using programmatic operations.

The database 120 may be included in the server 122 or in another computing system and/or storage system distinct from but coupled to or accessible by the server 122. The database 120 can include one or more non-transitory computer-readable mediums for storing the data. In some implementations, the database 120 may be incorporated with the memory 204 or may be distinct therefrom. Further, and without limitation, the database 120 may reside accessible on the network 102.

The input device 212 may include any device for inputting information into the server 122. It is shown with dashed lines in FIG. 2 to indicate that it is optional. In some implementations, the input device 212 may include one or more peripheral devices. For example, the input device 212 may include a keyboard, a pointing device, microphone, an image/video capture device (e.g., camera), a touch-screen display integrated with the output device 214, etc. The output device 214 may be any device capable of outputting information from the server 122. The output device 214 may include one or more of a display (LCD, OLED, etc.), a printer, a haptic device, an audio reproduction device, a touch-screen display, a remote computing device, etc. In some implementations, the output device is a display which may display electronic images and data output by a processor of the server 122 for presentation to a user, such as the processor 202 or another dedicated processor.

The bus 206 may include a communication bus for transferring data between components of a computing device or between computing devices, a network bus system including the network 102 or portions thereof, a processor mesh, a combination thereof, etc. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, SSL, HTTPS, etc.).

The components 220, 120 208, 212, and/or 214 may be communicatively coupled by bus 206 and/or processor 202 to one another and/or the other components of the server 122. In some implementations, the components 220, 120 208, 212, and/or 214 may include computer logic (e.g., software logic, hardware logic, etc.) executable by the processor 202 to provide their acts and/or functionality. In any of the foregoing implementations, these components 220, 120 208, 212, and/or 214 may be adapted for cooperation and communication with processor 202 and the other components of the server 122.

Example Accounting Data Structure (ADS) 300

Accounting systems may be bifurcated into single entry systems and double entry systems. Single entry systems record a transaction once. Single entry systems generally only track credits, debits, and cash. Single entry systems are generally unacceptable for tax purposes. Double entry systems record a transaction twice (e.g., both sides of the transaction are recorded). Double entry systems are acceptable for tax purposes and track a wider variety of accounts including but not limited to assets such as inventory.

Existing methods of implementing double entry systems are based on ledgers with T-accounts and are tabular in nature. By contrast, the CAS 220 generates a tree structure to represent what has traditionally been a tabular representation of the accounts. For example, the CAS 220 generates the ADSes 300a and 300b of FIGS. 3A and 3B. This unconventional, tree-based representation is referred to herein as the Accounting Data Structure (ADS). In addition to the tree structure, the ADS is significantly different from the traditional double-entry bookkeeping system in several ways. First, unlike a traditional system that categorizes accounts into one of five group nodes, which are illustrated as different account types: Income, Expense, Assets, Liabilities, Equity, in the ADS, there is no such necessary distinction. That is all accounts are the same "type" and treated uniformly in the system. Note that to facilitate human understanding and import/export to traditional systems, there can be interim groups that have those names. Second, there is no system for maintaining balance normalcy in the ADS. That is an account is not designated as debit normal or credit normal in the ADS. Instead, and thirdly, arithmetically positive and negative numbers are used instead of balance normalcy.

These differences offer are some useful properties of the ADS over the traditional method. For example, the tree structure makes transformations easier, more rigorous, and more efficient, which in turn makes reporting, computing outputs, and detecting errors easier and more efficient. Examples of useful transformations are creation of a financial report, converting between currencies, creating income tax adjustments where tax law and generally accepted accounting principles (GAAP) differ, and comparing the accounting books over time or between entities like rental or operating properties. Therefore, a person having ordinary skill in the art should recognize, among other things, that the ADS representation described herein has technical effects and improves the field of accounting and the operation of a computer performing functions related to accounting, e.g., by making transformations and/or generating outputs and/or detecting errors more efficiently, which may be measured and represented by one or more metrics such as lower development cost, fewer processor cycles, less time/lower latency, less electricity used, etc. depending on context.

Figure 3A:
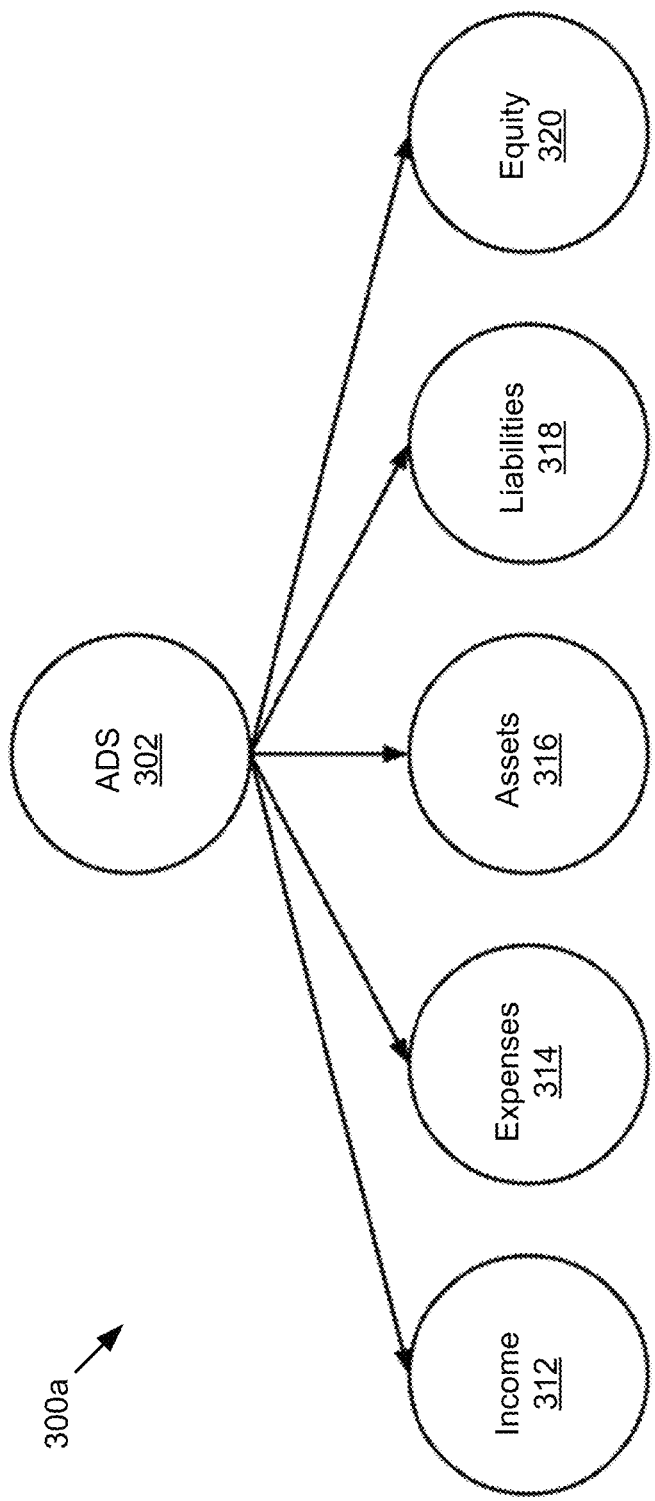
FIGS. 3A and 3B are diagram illustrating example Accounting Data Structures (ADS) in accordance with some implementations.

Now referring to FIG. 3A an example of a simple Accounting Data Structure (ADS) ADS 300a is provided. The ADS 300a includes a root node 302 labeled as "ADS," and a plurality of first-tier group nodes, i.e., the income 312 node, the expenses 314 node, the assets 316 node, the liabilities 318 node, and the equity 320 node, which are illustrated as leaf nodes in ADS 300a. It should be noted that the first-tier group nodes of ADS 300a are labeled with the five traditional accounting types' names as an illustrative example. In some implementations, the use of these five names aid user understanding and/or facilitate import of data from a traditional accounting system into the CAS 220 and for generating an ADS. However, one or more of the number of first-tier nodes, the names of the first-tier nodes, and what the first-tier nodes represent may be vary depending on the implementation and use case. For example, a set of first-tier group nodes may represent subsidiaries of a parent company, where the parent company is represented by the root node, rather than types of accounts. To summarize and simplify, the hierarchical structure of the ADS may be used for categorization. In some implementations, the categorization represented in the non-tabular tree structure of the ADS may be consistent with tax categorization and accounts (e.g., nodes associated with other income) may be grouped under an "other income" parent node (not shown).

Figure 3B:
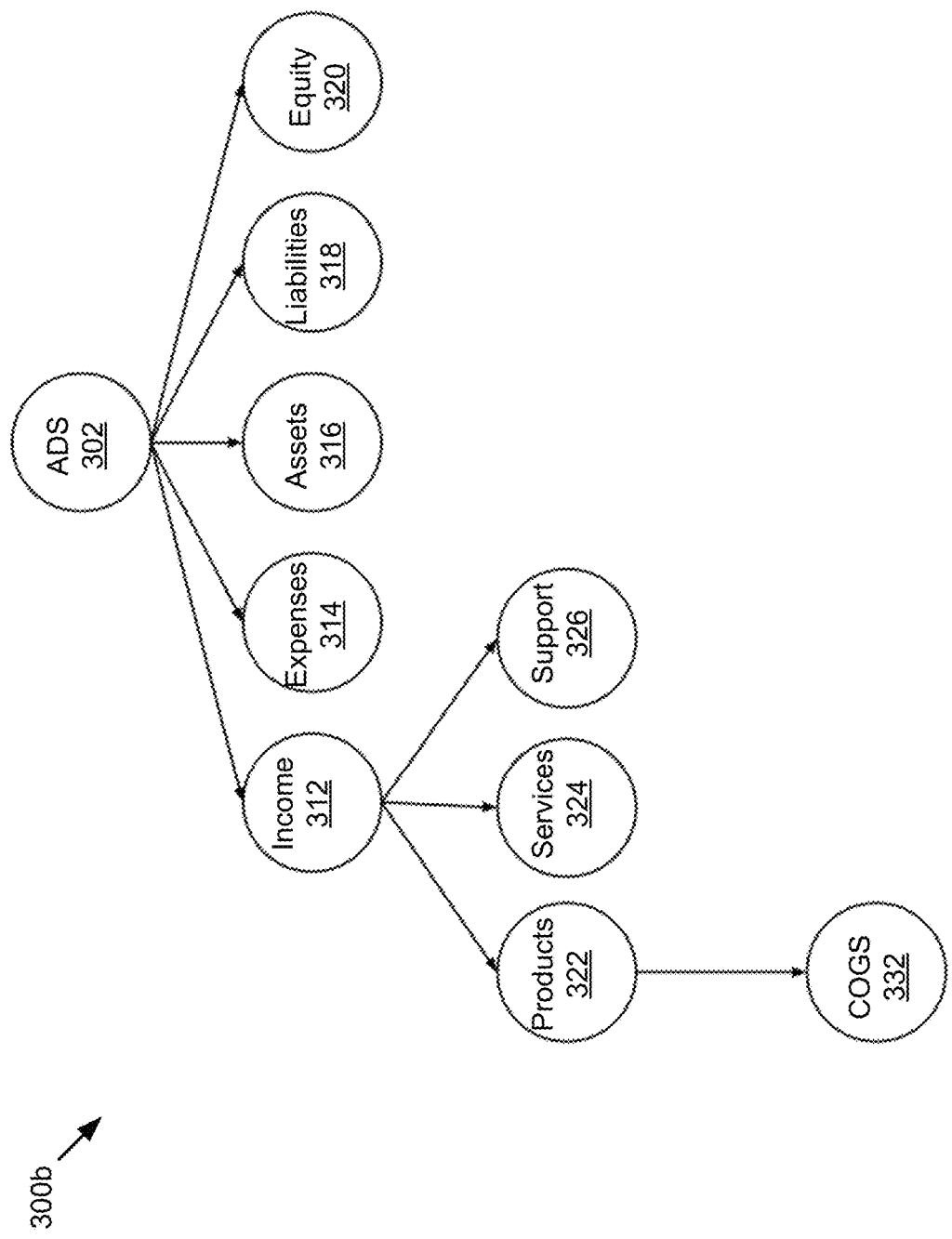

Referring to FIG. 3B, another example ADS 300b is illustrated. In the illustrated example, ADS 300b has a root node 302, and the same five first-tier group nodes as ADS 300a (i.e., the income 312 node, the expenses 314 node, the assets 316 node, the liabilities 318 node, and the equity 320 node). However, the income 312 node is a stem node in ADS 300b, not a leaf node as in ADS 300a. The income 312 node branches to a set of second-tier sub-group nodes, which in the illustrated example are associated with different account sub-types of the parent stem node, income, i.e., products represented by the products 322 node, services represented by the services 324 node, and support represented by the support 326 node. The products 322 node is further illustrated as connected to a third-tier node, i.e., the COGS 332 node, which represents the Costs of Goods Sold (COGS). Therefore, the ADS generated by the CAS 220 varies in structure and complexity based on a number of factors including the entity to which it is applied and the granularity of that entity's associated data and accounts. For example, when the entity represented by the ADS 300*b* is a service firm and provides only services, nodes such as the products 322 and COGS 332 nodes may be omitted or empty, depending on the implementation. As another example, an ADS associated with an individual may have different second-tier nodes associated with income (e.g., W2 employment, 1099 Contract Employee Income, etc.).

It should be noted that, while a traditional double-entry system must carefully track, among other functions, the different account types and convert between debit and credit boundary crossings, taking into consideration special accounts that are actually backwards from the balance normalcy of the account type, called a contra account, the ADS described in accordance with the present disclosure, e.g., ADS tree 300*a* etc., treats accounts uniformly, enabling the application of a transformation standard, described below, to handle the disparate example transformation use cases provided in a single, common way. For the purposes here, the transformations are described by a Transformation Data Structure (TDS). Note that the specific transformation examples described herein are for illustrative purposes and are by no means exhaustive. As for error detection, one type of transformation that executes a roll up can be used to verify that all accounts balance as expected. This TDS that captures this roll up is described below as an example transform.

Referring still to FIG. 3B, the ADS 300*b* includes a common example of a contra-like account, i.e., Cost of Goods Sold (COGS). The COGS node 332 in some accounting systems may be included in a expense subtree, but US Federal tax forms put COGS in the Income calculation, and many bookkeeping systems place COGS in an Expense account type, creating confusion. The tree-like ADS is agnostic as to where COGS is placed, and a TDS transformation, discussed below, can move the account as fitting for bookkeeping or tax views as desired and convenient for the use case (e.g., to generate tax forms or information or financial statements) without complicated cross-boundary conversions based on credit or debit normalcy.

With reference to FIGS. 3A and 3B the nodes are associated with, or represent, group types (more specifically account types) or sub-groups (more specifically account sub-types thereof). However, in some implementations, the nodes may be associated with additional or other information. The additional or other information may include one or more of a value, an account identifier, an entity, etc. In some implementations, the ADSes and/or their respective associated account(s) have identifiers, for which visibility and access to may be gated by metadata (e.g., as discussed below with reference to the Runtime Data Structure). In some implementations, a node may be associated with a value, e.g., the income 312 node of FIG. 3B may be associated with a value that is equal to the sum of the values associated with the products 322 node, the services 324 node, and the support 326 node. In some implementations, the sum of the values associated with the leaf nodes of an ADS equals zero, e.g., the sum of the values of COGS 332, services 324, support 326, expenses 314, assets 316, liabilities 318, and equity 320 nodes of ADS 300*b* is zero. In some implementations that may be modeling exercises, may be partial balances, or may be other use cases, the sum of values associated with leaf nodes may not be zero.

Example Operation Data Structures (ODS), Parameter Data Structures (PDS) & Transform Data Structures (TDS)

One purpose of an account system is to track changes to accounts over time. The CAS 220 may use an Operation Data Structure (ODS) to capture, or represent, one atomic change to an ADS. ODS operations may include but are not necessarily limited to numerically add a value (which may be zero, negative or positive) to the value at a node, implicitly creating a new node if not extant; remove node when its value is zero; referring to PDS elements for further processing, for example currency conversions and the math operations needed for such. An ODS may represent a transaction, e.g., collecting revenue for a sale, and/or paying taxes. Each ODS encapsulates the change to be made, to which account nodes in the ADS tree, and any external parameters, discussed below.

Figure 4:
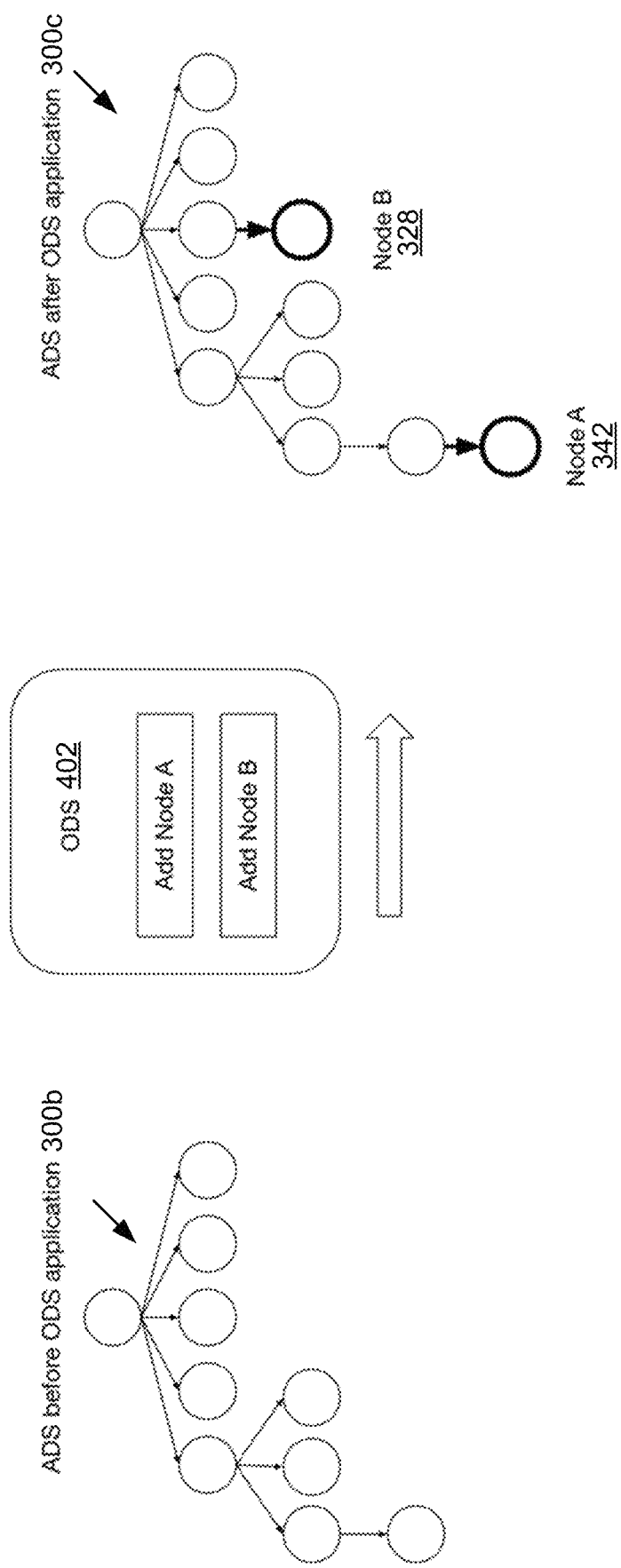
FIG. 4 is diagram illustrating an example Operation Data Structure (ODS) in accordance with some implementations.

For example, referring now to FIG. 4, an example of a simplistic ODS 402 that adds, or creates, two nodes—Node A 342 as a leaf off the COGS 332 node and Node B 326 as a leaf off the assets 316 node in the ADS 300*b* to generate ADS 300*c* is illustrated. In some implementations, an ODS affects two or more nodes.

While the ADS and ODS(es) capture most accounting operations completely, there are some that require more input parameters, for example, tax rates, a tax table, tax calculations, other published prices (e.g., stock prices, depreciated asset values, etc.), or currency exchange rates. These parameters are captured in the Parameter Data Structure (PDS). In some implementations, the passage of time in the system 100 is a parameter and captured in a string of PDSes. In some implementations, a parameter is, or a group of parameters are, referenced with an identifier which may consist of more than one sub-identifier (like Time and Jurisdiction for Tax Rates) each of which may also refer to another parameter.

Figure 5:
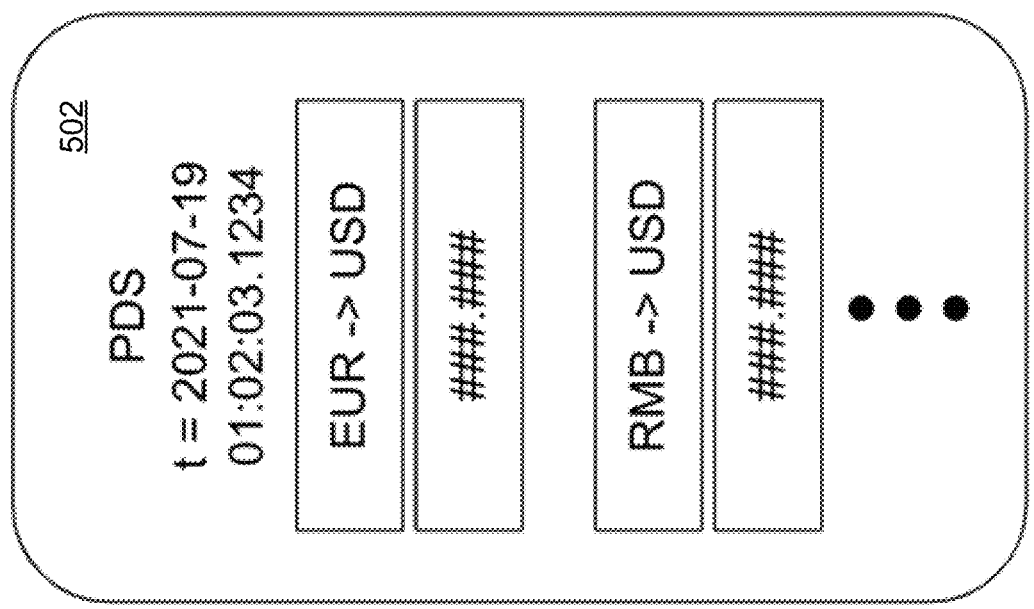
FIG. 5 is diagram illustrating an example Parameter Data Structure (PDS) in accordance with some implementations.

Referring now to FIG. 5, an example of a PDS 502 that captures parameters for time (t=2021-07-19 01:02:03.1234), currency conversion (Euros to US Dollars and Renminbi to US Dollars, represented by the instances of the "###.###"). Parameters may also be used to designate other parameters such as tax rates, transaction fees, or user designated variables, for example, different values for a transformation data structure (TDS) in shaping reports. It should be represented that the parameters discussed herein are not exhaustive and others exist and are within the scope of this disclosure.

A Transform Data Structure (TDS) is a collection of transforms to be applied to an ADS and optionally a PDS that computes a new structure, typically a transformed ADS, which may include a single node or multiple nodes. In some implementations, TDSes may output to another data format completely for reporting and other use cases. Transforms may include, but are not limited to, filtering, deletion, re-ordering, creation of nodes, mathematical calculations, modification of node data, etc. In some implementations, transforms are specified in a form for tree-walking.

For example, referring to Figure, an example of a TDS 602 that adds Node C 330 as a leaf node off the assets 316 node of ADS 300*c* in FIG. 4, moves data (i.e., 10% of the dollar value) from one node (i.e., Node 328 B 326) to each of two others (i.e., Nodes C 330 and Node D 326). As another example of a TDS, a roll-up TDS sums up a value at each child node. In recursive pseudo-code, an example roll-up TDS performs:

If no children nodes in this node, return this node's value;
Otherwise, return the sum of this node's value plus each of the results of applying this roll-up TDS to each child.

It should be recognized that the number and variety of potential transforms supported by the system 100 are too numerous and varied to list exhaustively, and those described herein are merely some examples and others are contemplated and within the scope of this disclosure. For example, operations in a TDS may include, but are not limited to, one or more of: emitting constant values, if-then-else and other conditionals, invoking other TDSes in a Runtime Data Structure (described below), mathematical operations, node references, comparative (e.g. equality, difference) operations, relative tree positions (e.g. child, sibling, parent, antecedents, first child, last child, preceding, subsequent), node tests (e.g. branch?, end?, root?), root node, PDS references, passing temporary values, references to values within a node, possibly modifying such values, tree decent type (depth-first, breadth-first, pre-order, post-order), insert, edit, and delete nodes, early exit, and assistive operations including debugging/logging operations, etc.

Figure 7:
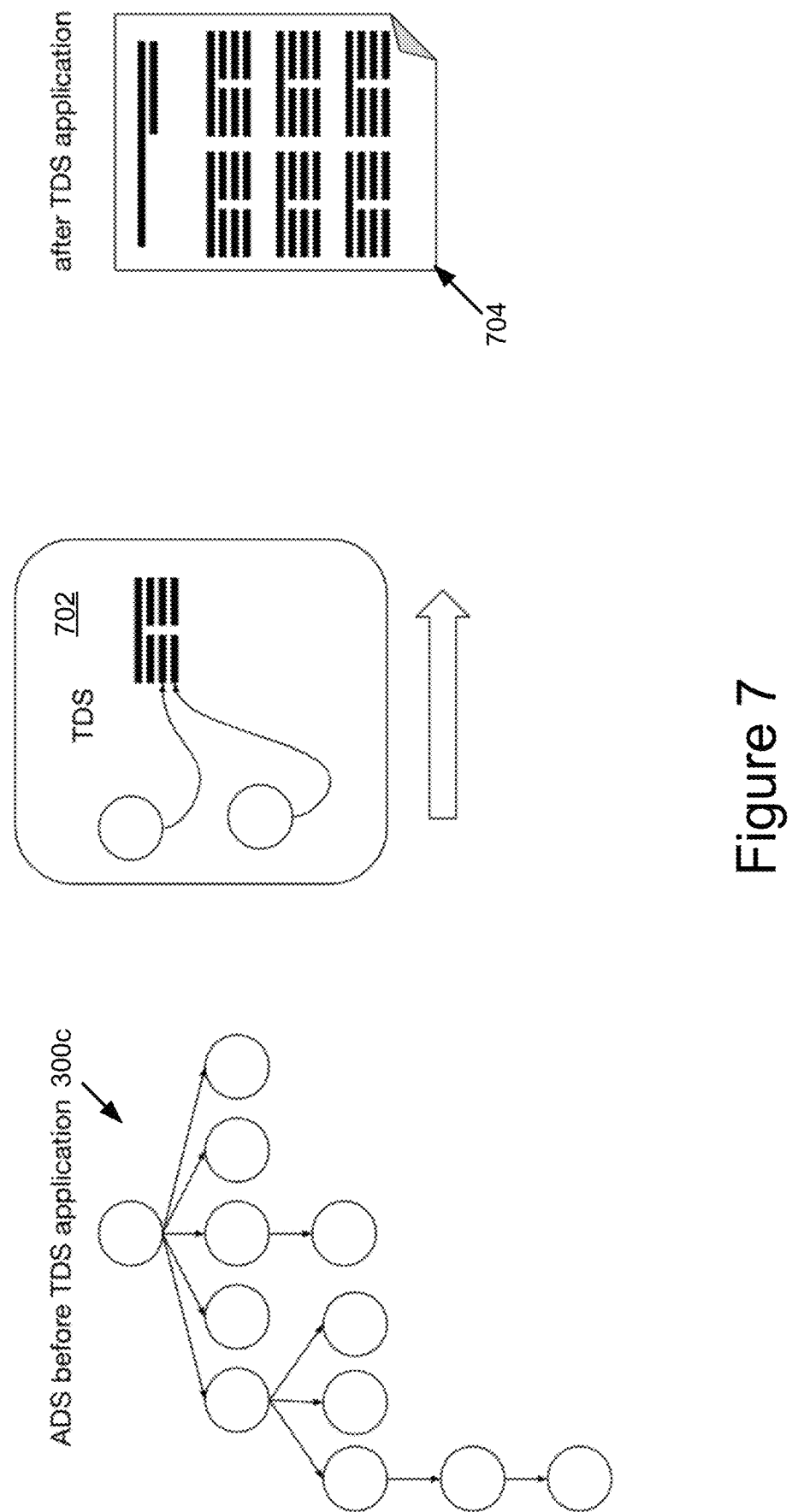
FIG. 7 is diagram illustrating an example of a TDS report example in accordance with some implementations.

In some implementations, a TDS may, additionally or alternatively, emit forms other than another ADS, e.g., to create another type of data structure or a report or for analytics. The outputs may be used as inputs into downstream systems like submitting tax reports, for example, a TDS can refer to PDS data which can, for example, refer to tax table data in a PDS. For example, referring to FIG. 7, an example of a TDS 702 that transforms the ADS 300c into a financial report 704. In one implementation, the TDS engine 234 applies TDS 702 by walking the ADS 300c and emits components of a formatted report 704.

In some implementations, one or more of a tax calculation and a tax report is expressed as a TDS and, when applied to an ADS, performs the tax calculation and delivers the results in a reporting format. Expression of a tax calculation as a TDS reduces a complex business problem (i.e., accurate tax calculation) into a well-defined scope enables validation and reasoning in tax calculations. Expression of reporting as a TDS enables delivery of tax calculation results in one or more formats including, but not limited to, XML, HTML, CSV, XLS, TXT, and PDF.

Figure 8:
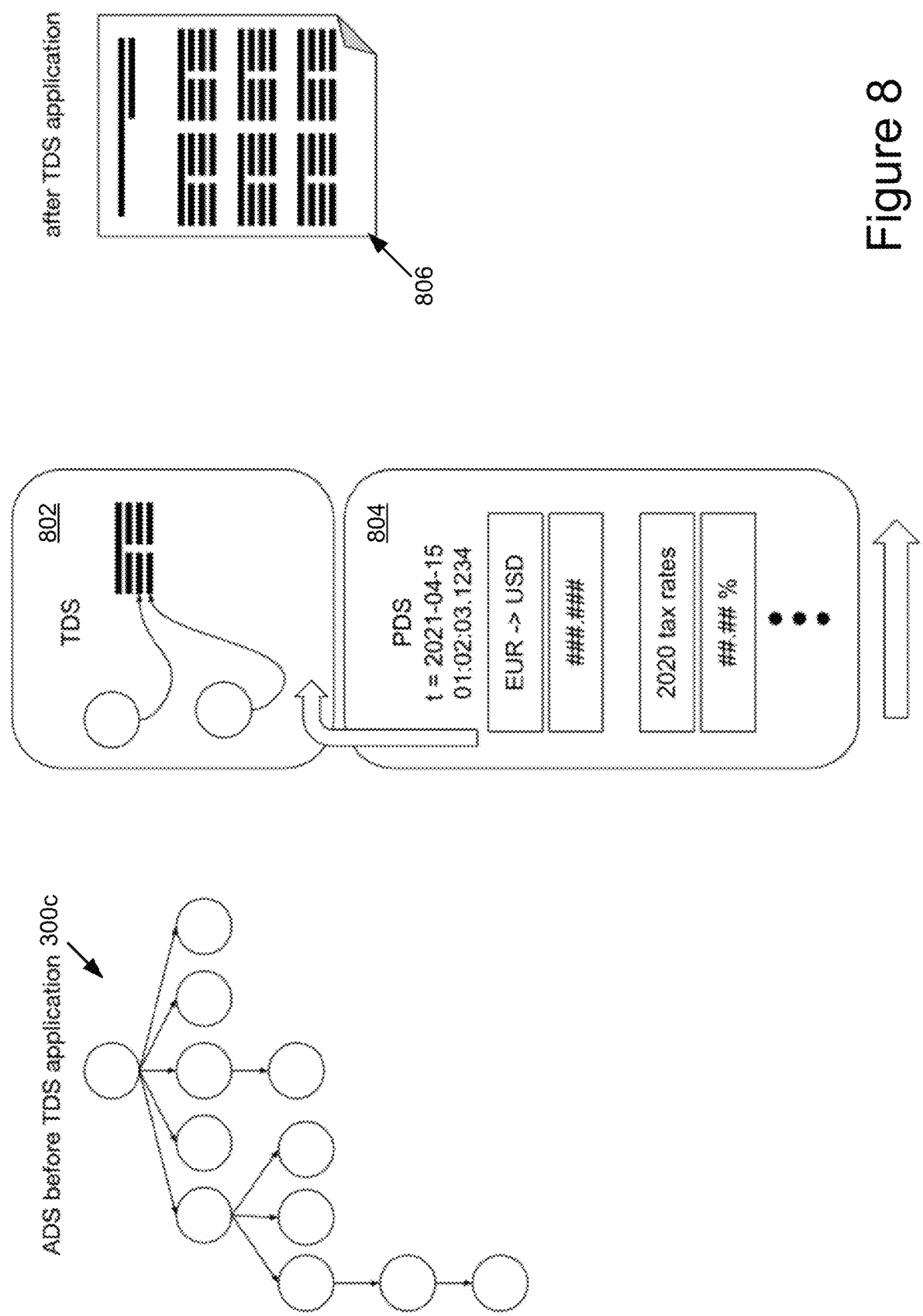
FIG. 8 is diagram illustrating an example of a TDS calculating transform example in accordance with some implementations.

Referring now to FIG. 8, an example of a TDS 802 that refers to PDS data 804, in this case to be applied to ADS 300c to perform a tax calculation and output the tax form 806, is illustrated. In some implementations, a TDS may be used to calculate modified versions of an ADS (with optional PDS) for reporting, transfer to other system, analysis, etc.

Figure 9:
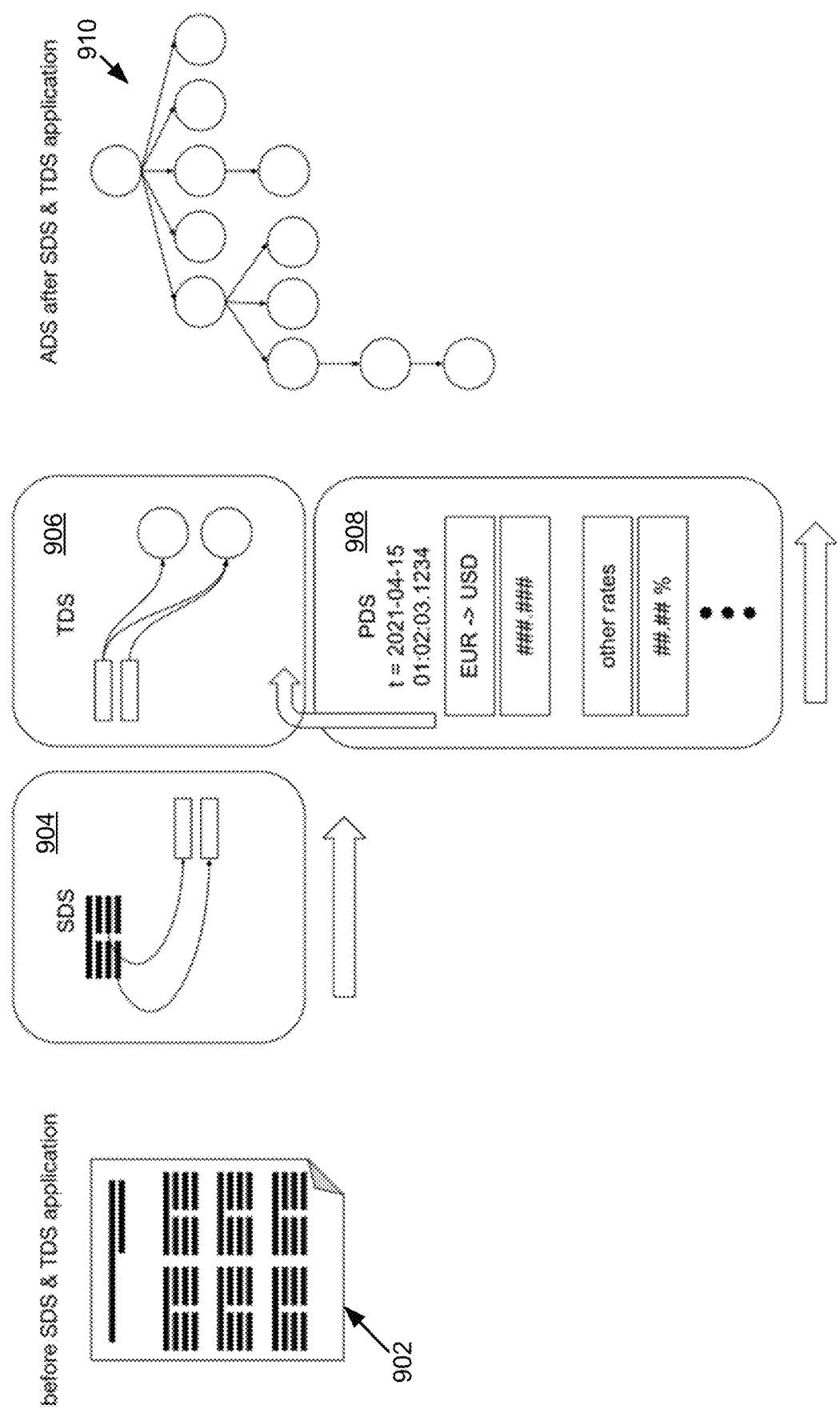
FIG. 9 is diagram illustrating an example of a Scanning Data Structure (SDS) working with a TDS and PDS to consume a report from an external system and creating an ADS in accordance with some implementations.

In some implementations, a Scanning Data Structure (SDS) can be applied in front of a TDS that describes a tokenizer and parser, so the SDS and TDS together transfer from other systems by consuming, for example, formats like, but not limited to, the common CSV (comma separated values) file or XML, or JSON data. In some implementations, SDS operations are lexical analyzer operations (including regular expressions that match patterns, emitting tokens) and BNF (Backs-Naur Form) grammars that create a parse tree suitable for consumption by a TDS. For example, referring now to FIG. 9, a diagram of an example SDS 904 working with a TDS 906 and PDS 908 to consume a report 902 from an external system and generate an ADS 910. In some implementations, the SDS may parse information from sources like account statements to generate an ADS. In some implementations, the SDS may parse information from sources such as tax legislation, tax schedules, etc. and generate other structures (e.g., TDS(es) and/or PDS(es)). In some implementations, the SDS generates a PDS to express semantic tax concepts for a particular jurisdiction (e.g., that jurisdictions marginal tax tables, attached statements, etc.). In some implementations, the PDS encodes the semantic tax concepts as a directed acyclic graph (DAG) structure, which may handle multiple paths. It should be recognized that the generation of such PDSes allows for efficient capture of new, or modified, tax information for existing, or new, jurisdictions, and further may allow granular validation and testing.

Example Computed Structures and Calculation Engines

In some implementations, one or more of the calculation engines 232, 234, 236, and 238 accept one or more of ADS, ODS, PDS, and TDS structures to compute changes to a chart of accounts over time and/or across other parameters, for example but not limited to, across a collection of real estate assets for comparative analysis.

ODS Engine 232: In some implementations, the ODS engine 232 applies an ODS to an input ADS and outputs an output ADS. In some implementations and use cases, the ODS engine 232 beginning with a "starting" ADS as an initial input, sequentially applies ODSes (generating intermediary output ADSes each time an ODS is applied) to model accounting events that occur in an organization (represented by the sequence of ODSes) and resulting in an "ending" ADS, i.e., a last output ADS in the sequence. In some implementations, these ODS-centric calculations are performed by the ODS engine 232.

In some implementations, the ODS engine 232 receives a stream of data, e.g., from a user interface (UI) and/or an Application Programming Interface (API) called on demand or polled on a regular basis (to get a bank feed for example. In some implementations, the ODS engine 232 handles receipt of incoming data stream and generates a stream of ODSes based on that data stream. A sequence of PDSes may optionally inform the ODS engine 232 in its calculation. For example, PDS may inform an ODS in a currency conversion or a fair value reference.

Figure 10:
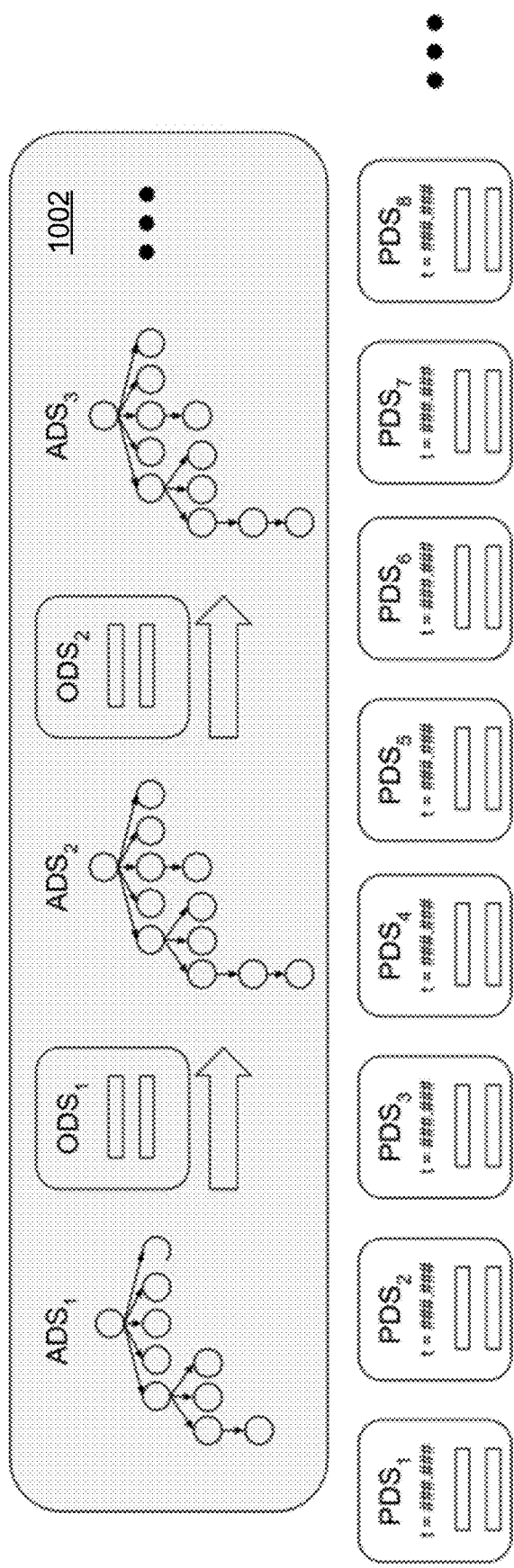
FIG. 10 is diagram illustrating an example of an ADS chain in accordance with some implementations.

Referring now to FIG. 10, an example of an ADS Chain 1002 and a PDS stream are illustrated. The ADS stream 1002 is illustrated and bounded by a grey-shaded box. In some implementations, the various ODS instances, e.g., $ODS_1$ and $ODS_2$, are generated by the ODS engine 232 and applied by the ODS engine 232. For example, the ODS engine 232 obtains the starting ADS, $ADS_1$, applies a first ODS, $ODS_1$, and outputs $ADS_2$, the ODS engine 232 applies a second ODS, $ODS_2$, to $ADS_2$ and outputs another ADS, $ADS_3$, and so on (as indicated by the ellipses) until an ending ADS (not shown) is output, e.g., representing a current state of accounts. The PDS stream illustrated as the row of PDS instances $PDS_1$ through $PDS_6$ and beyond are illustrated as each including a "t=###.###" and are therefore indicative of a time parameter. However, it should be understood that other parameters may be used, and those parameters may, or may not, align perfectly with a cadence of ODSes in the ADS stream 1002.

The ODS stream at the top captures accounting changes over the sequence to the business that the ADS models, and the PDS stream below the ODS stream captures parameters that change over the course of the chain. The use of a stream of changes in the ODS is particularly advantageous. The design of the ADS chain with a stream of ODSes allows the CAS 220 to do things like "fork."

Accordingly, it should be recognized that a fourth difference between the ADS tree and traditional systems is that ADS trees may be chained together over a parameter, usually but not necessarily time. The chained ADSes may create a timeline (or a parametric "line" if the parameter is not time). This chaining of ADSes further enables the system 100 to provide validation, reconciliation, error-detection, and backtracking for forensic, analytic, and planning purposes. The chained ADSes are connected to each other by another data structure called the Connection Data Structure (CDS), also described further below.

It should be further recognized that while the various instances of the ADS tree structures illustrated in FIGS. 10-16 may be similar or identical. The similarity or identicality is for ease of depiction in the provided examples and may not necessarily the case in the system. For example, different ADSes in different ADS streams may differ more than is illustrated, and the ADSes in an ADS stream may vary and change more than is illustrated.

TDS Engine 234: The TDS engine 234 applies one or more transforms. As indicated above, the possible transforms are varied and defy a complete listing. In some implementations, the potential transforms may include one or more of an ADS modifying transform (e.g., as described with reference to FIG. 6) may include one or more report generating transforms (e.g., as described with reference to FIG. 7) and/or may include one or more SDS-assisted transforms (e.g., as described with reference to FIG. 9).

Figure 11:
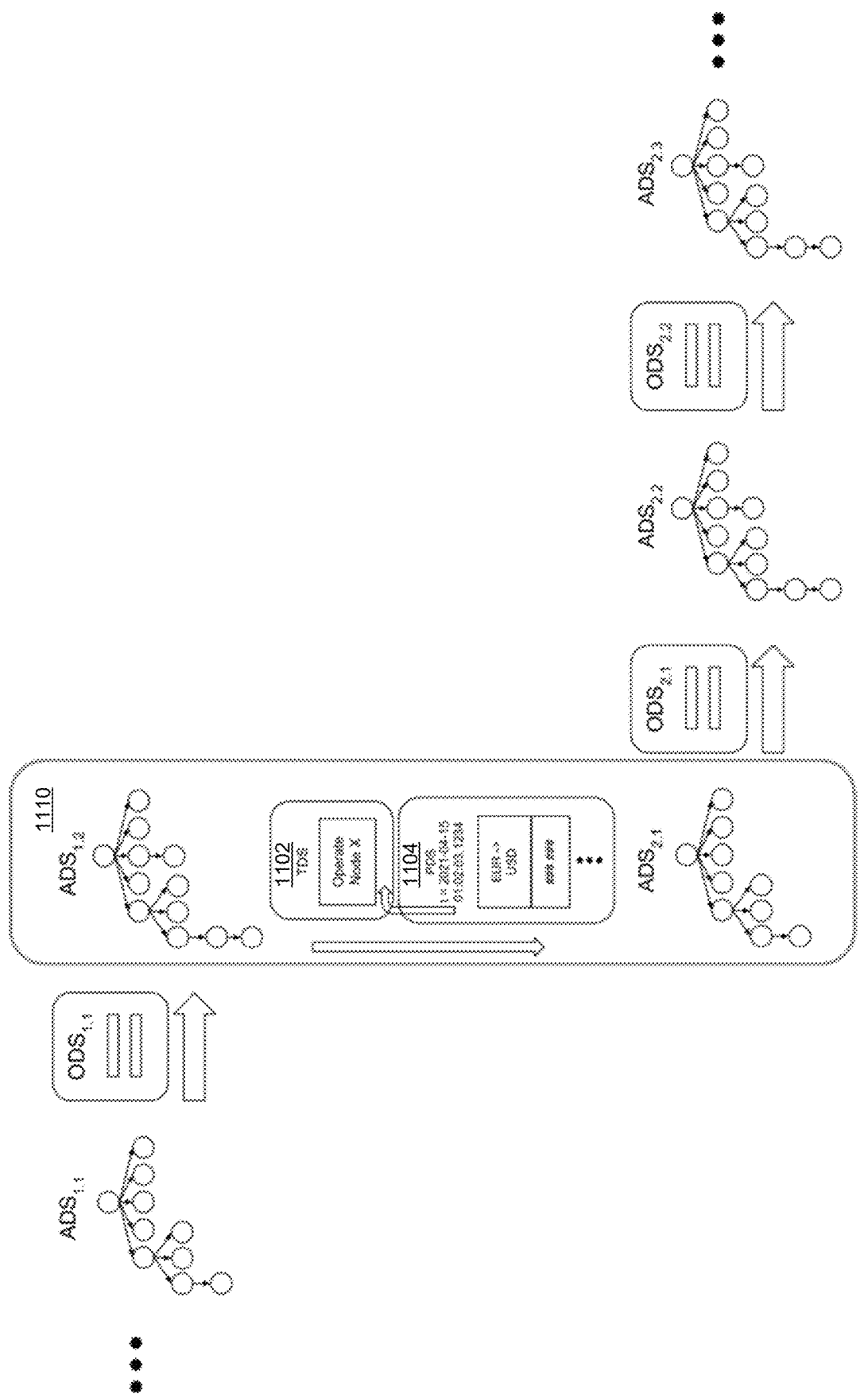
FIG. 11 is diagram illustrating an example of an ADS closing period in accordance with some implementations.

Referring now to FIG. 11, in some implementations, at the end of a measurement period (which could be as often as after every ODS, but traditionally may be tied to a calendar, or fiscal, quarter or year) a TDS (e.g., TDS 1102) is computed, by the TDS engine 234, on an ending ADS (e.g. $ADS_{1.2}$) and an optional PDS (e.g. PDS 1104) that closes the books and creates the next "starting" ADS (e.g. $ADS_{2.1}$). Specifically, for example, any retained earnings are computed and used to calculate the next ADS's balances. FIG. 11 illustrates a close of period 1110 at the end of an ADS Chain (shown comprising $ADS_{1.1}$ and $ADS_{1.2}$) allowing it to continue in the next period (as a new ADS chain beginning with $ADS_{2.1}$). The TDS engine 234 may, e.g., consolidates retained earnings by applying a transformation, captured and represented as TDS 1102, to allocate sums as the shareholders direct. In some implementations, TDS-centric calculations are performed by the TDS engine 234. In some implementations, the TDS engine 234 manages and/or performs other TDS-related functions, e.g., exporting data and creating reports.

ADS Forking: It should be recognized that a fifth difference between the CAS system and traditional accounting systems is the self-containment of the ADS and attendant structures, which allow the CAS 220 to create ad hoc copies, e.g., for performing what-if analysis and copying for educational purposes. This capability in the domain of software development is called "forking" and the CAS 220 enables the forking of accounting information, which is described further below.

In some implementations, one or more ODS engines 232 may apply different ODS streams to the same ADS with different ODS streams, e.g., to explore what-if scenarios, optimization analysis, A/B testing, or other possible alternative scenarios. The potential what-if scenarios, optimizations, and alternatives that may be explored are so varied and numerous as to defy a complete listing. However, for enhanced understanding, examples may include, but are not limited to "What's the difference in tax liability when we file jointly vs. individually," "what if we repatriated a portion of our overseas earnings and used it to pay a dividend," "what if the corporate tax rate were to change to X," "what if we put X amount of our cash on hand into Y cryptocurrency Z quarters ago," "How do the numbers change if we were Last In First Out (LIFO) instead of First In First Out (FIFO)," "what would it look like if we moved our servers/sales to X jurisdiction with Y tax rate," etc. Additionally, the forks could represent, for example without limiting, what-if analysis for planning and projecting; be a pedagogical device in a class where each fork is owned by an individual student group; or represent different multi-verses in a game.

Figure 12:
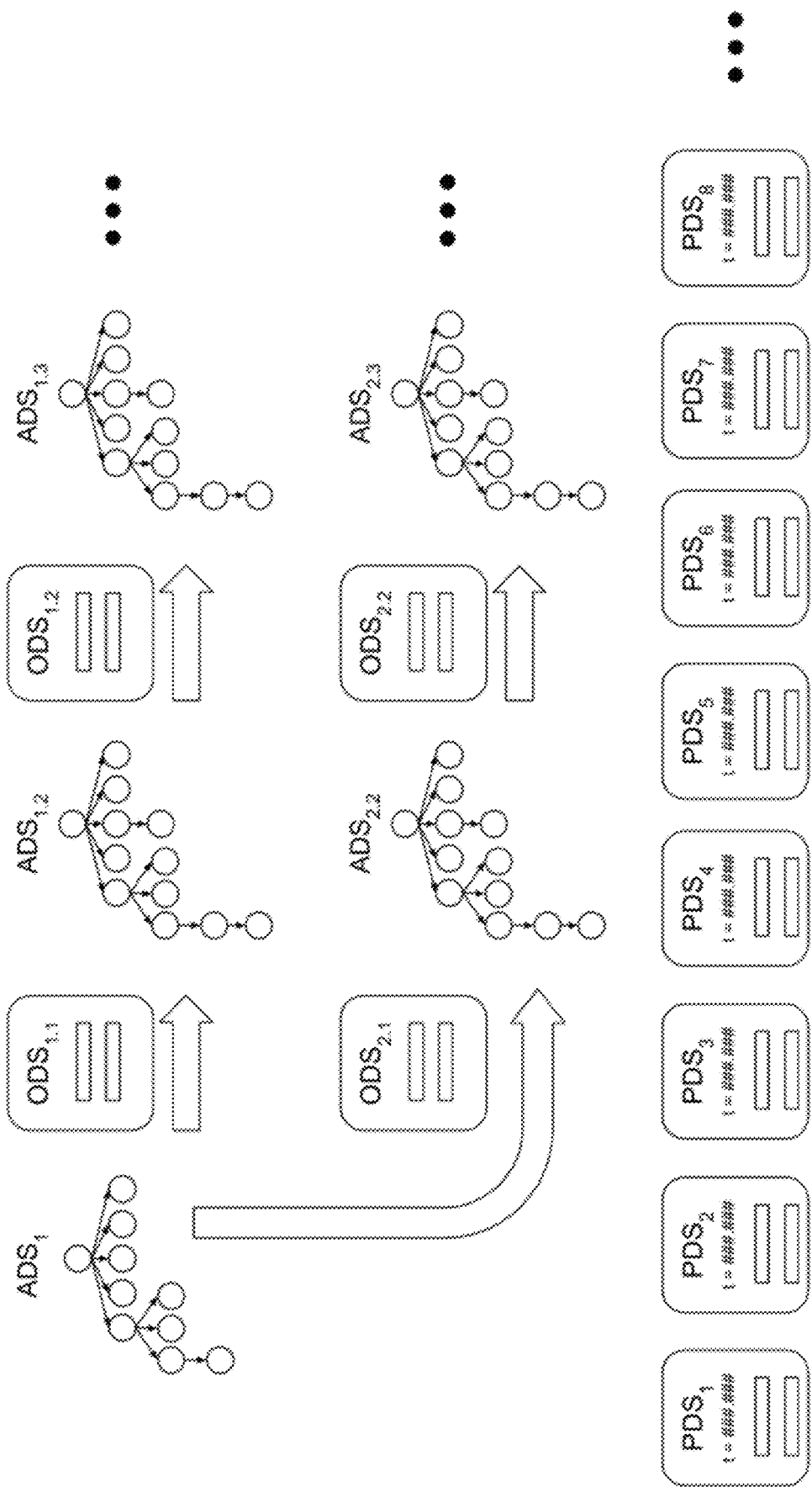
FIG. 12 is diagram illustrating an example of ADS forking in accordance with some implementations.

Referring now to FIG. 12, a diagram illustrating an example of forking is illustrated in accordance with an implementation. As illustrated, $ADS_1$, in the upper-left, is "forked" into two ADS chains, with different ODS streams. In the first (upper) ADS chain, $ODS_{1.1}$ is applied to $ADS_1$ resulting in $ADS_{1.2}$, then $ODS_{1.2}$ is applied to $ADS_{1.2}$ resulting in $ADS_{1.3}$ and so forth. In the second (lower) ADS chain, $ODS_{2.1}$ is applied to $ADS_1$ resulting in $ADS_{2.2}$, then $ODS_{2.2}$ is applied to $ADS_{2.2}$ resulting in $ADS_{2.3}$ and so forth. While not pictured, additional forks (not shown) may be created from $ADS_1$ or any other ADS (e.g., $ADS_{2.3}$) depending on the use case. The PDS stream (i.e., PDS' through n) may provide context (e.g., temporal context) and may itself be forked (e.g. to represent increase/decrease in exchange rates, tax rates, etc.).

RDS Engine 236: In some implementations, the runtime data structure (RDS) engine 236 is a governance system that determines when an ODS engine 232 or TDS engine 234 should execute. In some implementations, RDS data and the RDS engine 236 include the various xDS (e.g., the ADS, ODS, PDS, and CDS) structures and engines (e.g., 232, 234, and 228). In some implementations, the RDS engine 236 manages access, creation and retirement of various entities, for logging, and for debugging.

Figure 13:
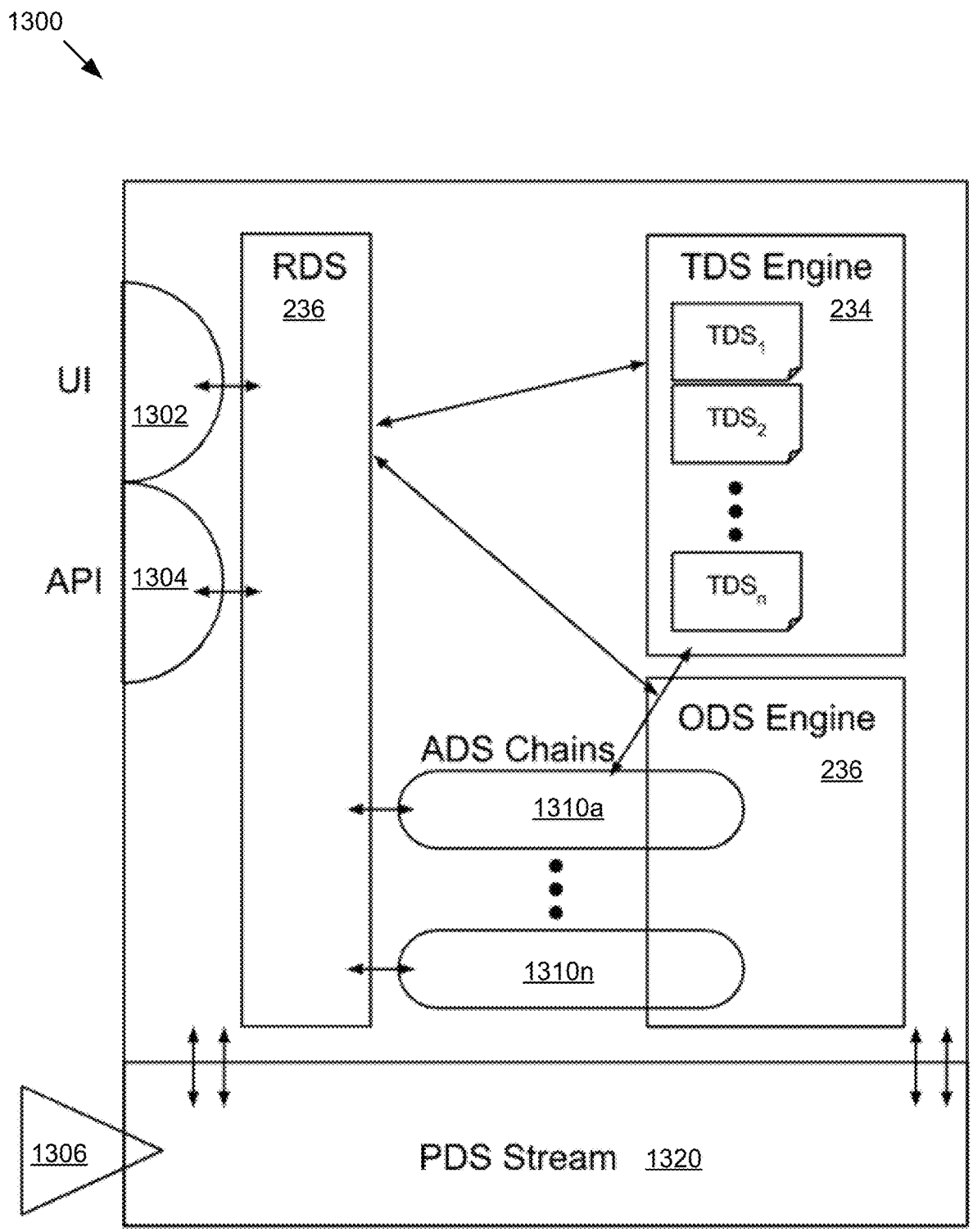
FIG. 13 is diagram illustrating an example schematic of the runtime in accordance with some implementations.

FIG. 13 illustrates an example schematic of the runtime 1300 in accordance with some implementations. An API 1304 and/or UI 1302 connect to the external world, e.g., a client device 106 via the network or a third-party server (not shown) storing a user's account information, etc. The ODS engine 232 applies one or more ODSes (not shown) and emits the ADS chains 1310a-n. An endpoint 1306 for collecting PDS streams 1320, which may include one or more PDSes (not shown), is at the bottom and informs the rest of the system. The endpoint 1306 could include, e.g., a clock or other synchronizing information, a stream of currency exchange rates, stock trading values, tax tables, published prices, etc. The RDS 236 gates access and controls invocation of the TDS engine 234 and ODS engine 232, e.g., to provide at least some of the features and functionalities described herein. The TDS engine may hold various TDS transforms ($TDS_1$ through $TDS_n$). ADS chains are created as needed by user input or implicitly for certain operations like forks or what-if planning.

Example High-Level, Macro Structure—Connection Data Structure (CDS)

CAS 220 may model an entire universe of ADSes, and the Connection Data Structure (CDS) performs the function connecting two or more ADSes together. The CDS represents a particular change in the universe of ADSes, usually, but not necessarily, at a particular point in time. (Time skew and other artifacts can be modeled with virtual ADSes that temporarily receive ODS changes during/within the artifact). In some implementations, CDS includes two or more ODSes, referring to two or more ADSes, and one or more PDS entities. A concrete example of a CDS is the sale/purchase of an asset. In this simple example, the selling ADS (i.e., the ADS associated with the seller), via application of one or more ODSes, removes an asset from inventory and receives revenue. The purchasing ADS (i.e., the ADS associated with the seller), via one or more ODSes, gains the asset and makes a posting crediting the cash account. In some implementations and use cases, a CDS may include only one ODS, affecting one ADS. In some implementations, such a CDS may be used for time stamping, synchronization, or operational controls.

In some implementations, an ADS may be associated with a user of the system 100 or a non-user. A user of the system 100 may import or input data, which the CAS 220 uses to generate the ADS. Since adoption of the CAS 220 by all parties for a given CDS may not be guaranteed, the CAS 220 may generate and update virtual ADSes for non-user entities to represent those entities within the system 100. In some implementations, for importing, the system 100 applies special tokenizers for CSVs, Microsoft Excel XLSX, and various vendors like Intuit's QBO, Xero, and Sage and generates the ADS for the entity on behalf of the user. In some implementations, once account information is imported, the system 100 chains the changes moving forward. As for the events, the system 100 generates a CDS that identifies and groups changes (e.g., represented by a set of two or more related ODSes). Those changes may come from, e.g., an API or UI that marks, in this purchase case, the consummation of a transaction. Note that, depending upon system 100 adoption, the system may "see" one of the two sides of the transaction, because, for example, only the buyer or only the seller uses the system 100. In some implementations, in those scenarios, a virtual ADS is generated (or updates) to hold the side of the transaction until the associated entity makes their account information available to the system 100 (e.g., becomes a user and imports their account information). In some implementations, the ADS generated by the import replaces the virtual ADS maintained for that entity. Another example event that may trigger a CDS is reconciliation of sub-entities. However, these are merely examples and others are contemplated and within the scope of this description.

Figure 14:
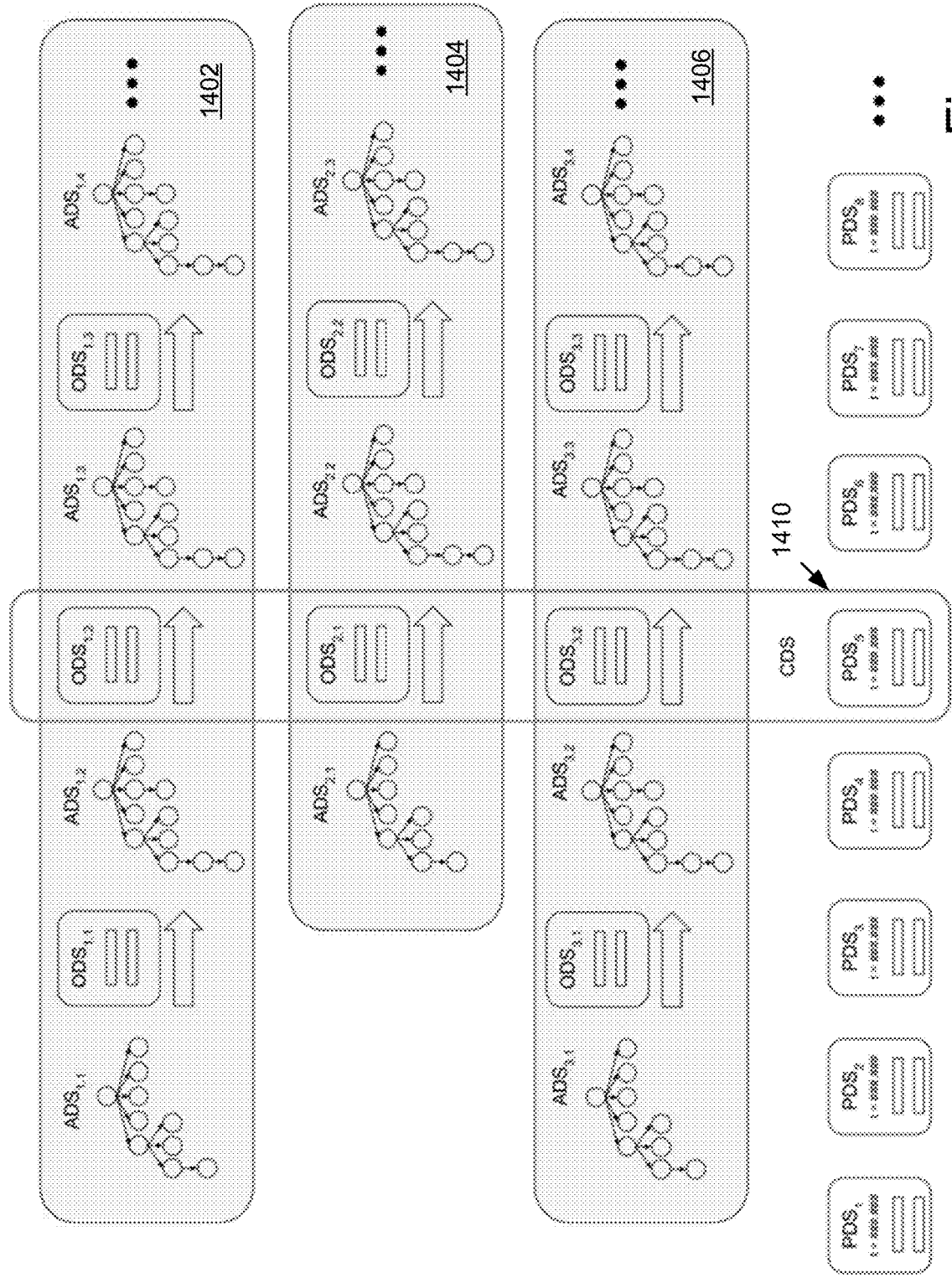
FIG. 14 is diagram illustrating an example of a Connection Data Structure in accordance with some implementations.

Referring now to FIG. 14, an example CDS 1410 that connects a PDS (i.e., $PDS_5$) at the bottom and three ODSes (i.e., $ODS_{1.2}$, $ODS_{2.1}$, and $ODS_{3.2}$) in three different ADS chains (i.e., 1402, 1404, and 1406). As an example, the CDS 1410, may represent a sale of an asset; the ADS stream 1402 may be associated with a purchaser; ADS stream 1404 may be associated with the seller; and ADS stream 1406 may be associated with a financer such as a credit card company or bank, and the ODSes 1.2, 2.1, and 3.2, respectively, represent the changes to those entities ADSes (and by extension their accounts) resulting from that transaction. An implementation of CDSes may refer to ODSes by inclusion or by reference to unique IDs. Some implementations of CDSes may include timestamp information or other synchronizing information, references to entities or approximate locations of entities in a PDS stream, audit trail information such as originating source and authority.

In some implementations, an external event, such as a purchase order and fulfillment triggers a CDS to be created and applied by the system. In some implementations, the endpoint that accepts and processes the event is in one or more RDS engines 236. In some implementations, a collection of these one or more RDS engines 236 forms the CDS engine 238 that calculates, or identifies, these connected changes. The CDS engine 238 may, in some implementations, compute a sequence, or stream, of CDSes together, analogous to the ODSes and ODS engine 232. In some implementations, a single RDS engine may participate in more than one CDS engine 238.

Figure 15:
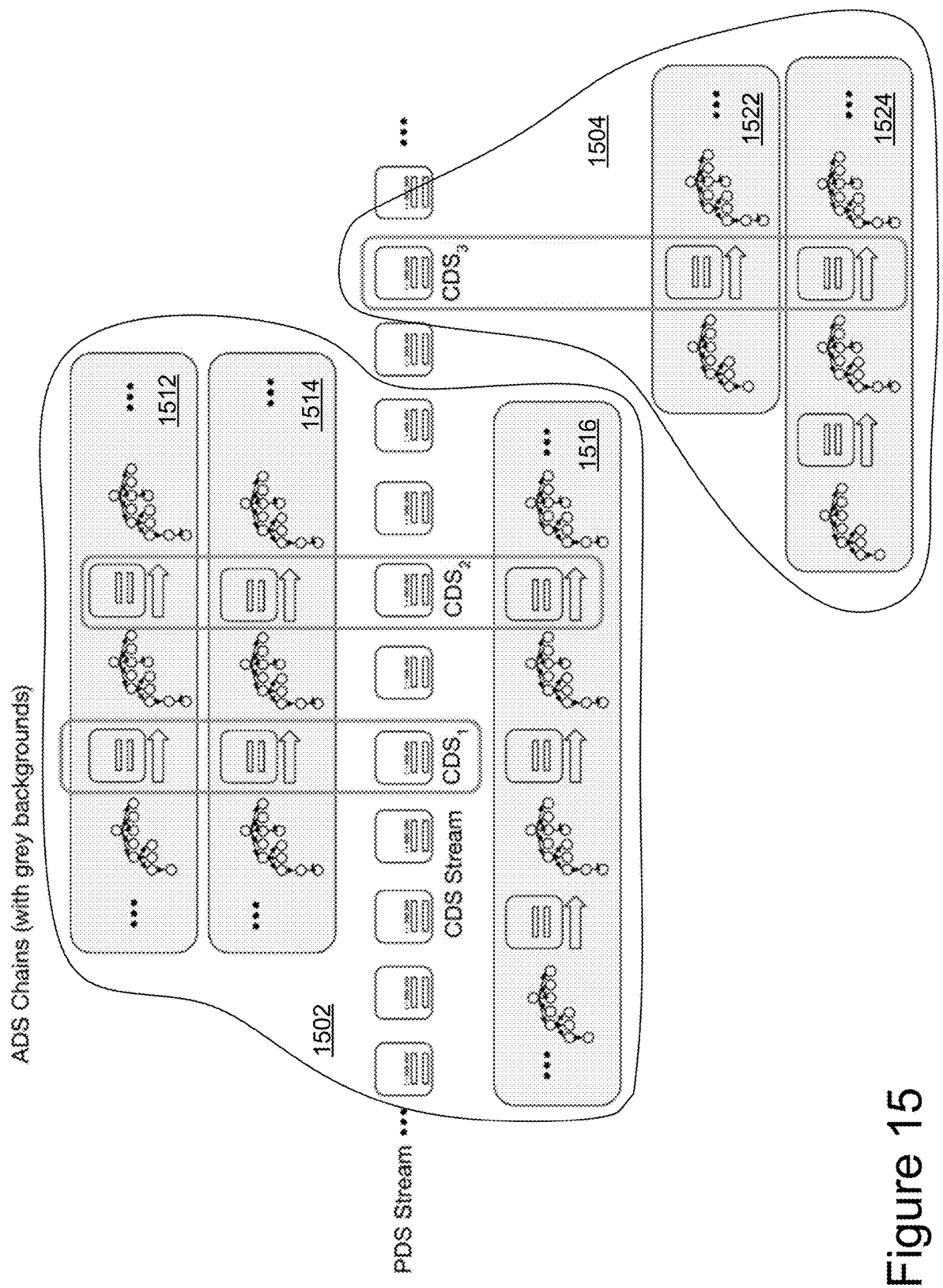
FIG. 15 is diagram illustrating an example of a CDS Stream in accordance with some implementations.

FIG. 15 illustrates an example of a CDS stream that also shows its partitionability. CDSes (i.e., $CDS_1$, $CDS_2$, $CDS_3$) are applied to the ADS chains in order. Note however that the group of CDSes in partition 1502 do not include or involve any ADS chains in partition 1504. Stated differently, partition 1502 and partition 1504 are mutually exclusive in that there exists no CDS linking an ODS in an ADS chain associated with partition 1502 to an ODS in an ADS chain associated with the partition 1504. Therefore, the set of ADSes 1512, 1514, and 1516 is partitionable from the set of ADSes 1522 and 1524, and these two partitions can be logically split and transacted independently. For example, the partitions may be assigned to separate computing resources (e.g., different servers, virtual machines, databases, networks, etc.)

In a large system, the PDS structure becomes a synchronization point and bottleneck. A parallelism analysis may partition the universe of CDS entities to improve throughput. For practical purposes, because the universe of CDSes may not be known perfectly for the future (i.e., a future transaction and associated CDS may involve ADS streams from different partitions and thus destroy the mutual exclusivity), an immutable synchronization point may be established for forward progress. The synchronization mechanism, or point, may be a shared global clock-like mechanism, or a distributed mechanism, logical clocks or other synchronization mechanism may be used, depending on the implementation. In implementations where guarantees that partitions will never be crossed are available, separate synchronization mechanisms for each partition may be used. For implementations that can provide only weaker guarantees, and can tolerate corrections or backtracking, partitioning can be used with some risk. That risk may include, for example, having to collapse two, previously separate partitions into a larger, combined partition and moving forward (post the new, synchronization point) with the larger partition or may include recalculating past operations, or may include adding adjusting transactions for corrections.

Example incremental adoption techniques: In some implementations, the CAS 220 supports incremental adoption and partial visibility of the universe of ADSes by using virtual ADSes as a sink/source. A virtual ADS represents one or more partner ADSes that are not known at the time an ODS is computed. Virtual ADSes may be used to partially model entities when complete data is unavailable at a point in time. If, or when, a virtual ADS can become a "real" ADS, the ODSes may be applied to the real ADS, or synchronized with its ODS stream.

Figure 16:
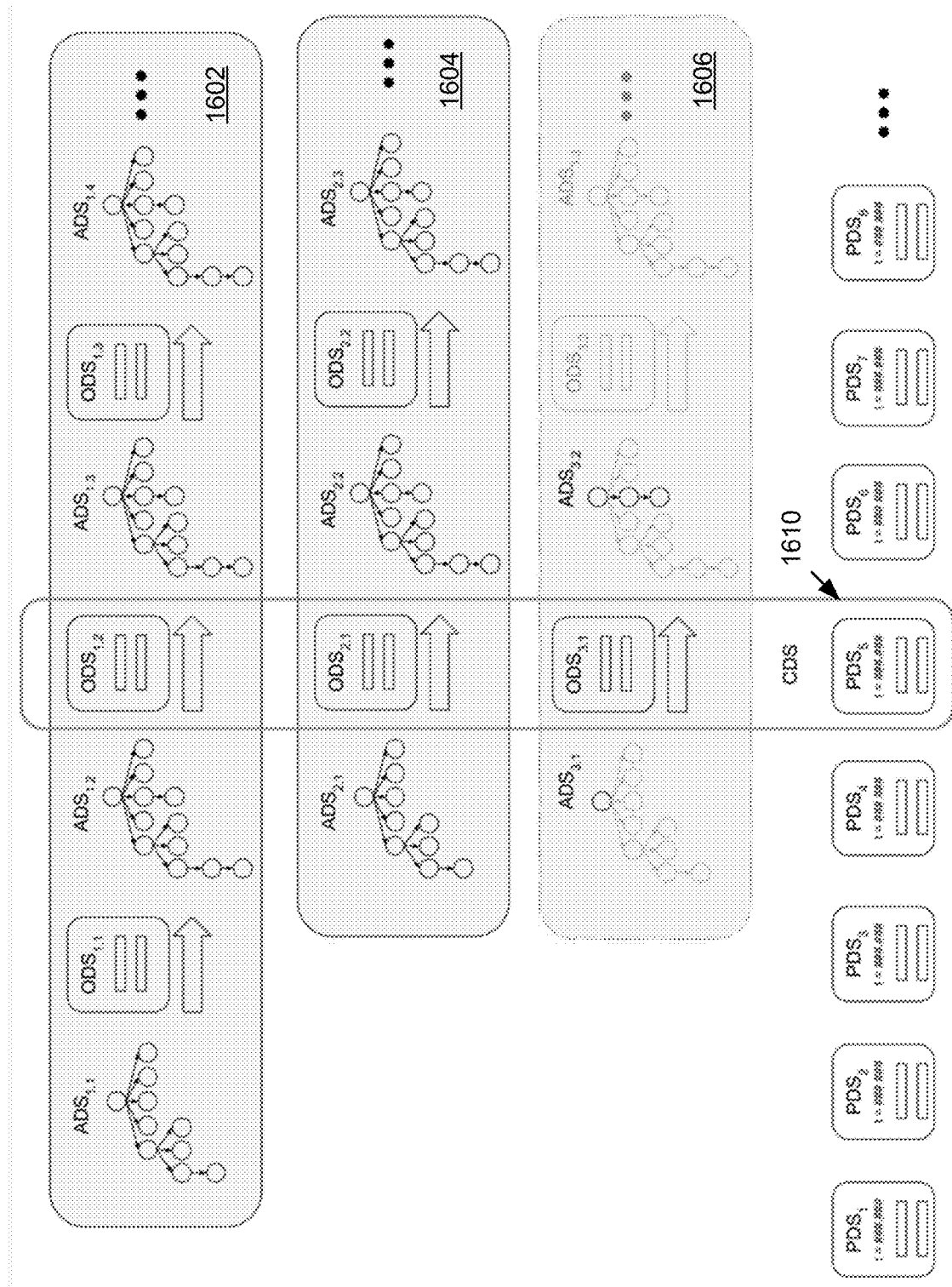
FIG. 16 is diagram illustrating an example of a virtual ADS in accordance with some implementations.

FIG. 16 illustrates an alternate view of the Connection Data Structure 1610 according to some implementations. While FIG. 14 illustrates a use case in which all three ADS streams 1402, 1404, and 1404, were associated with entities that have made their account data available to the system and thus involve "real" ADSes, FIG. 16 illustrates a use case in which an event (e.g., a transaction involves an entity or account) and an associated, "real" ADS is not present, accessible, or existent in the system. In some implementations, the CAS 220 generates the virtual $ADS_{3.1}$, as the "real" ADS is not known at the time of the computation of the CDS, so the virtual $ADS_{3.1}$ is used to track the change. As illustrated, the virtual $ADS_{3.1}$ has greyed-out nodes, which illustrates that the actual, or real, ADS structure is unknown. As the CAS 220 captures more events, the virtual ADS may be fleshed out based on that information, as represented by $ADS_{3.2}$ having more black nodes, which may be based on $ODS_{3.1}$.

Figure 17:
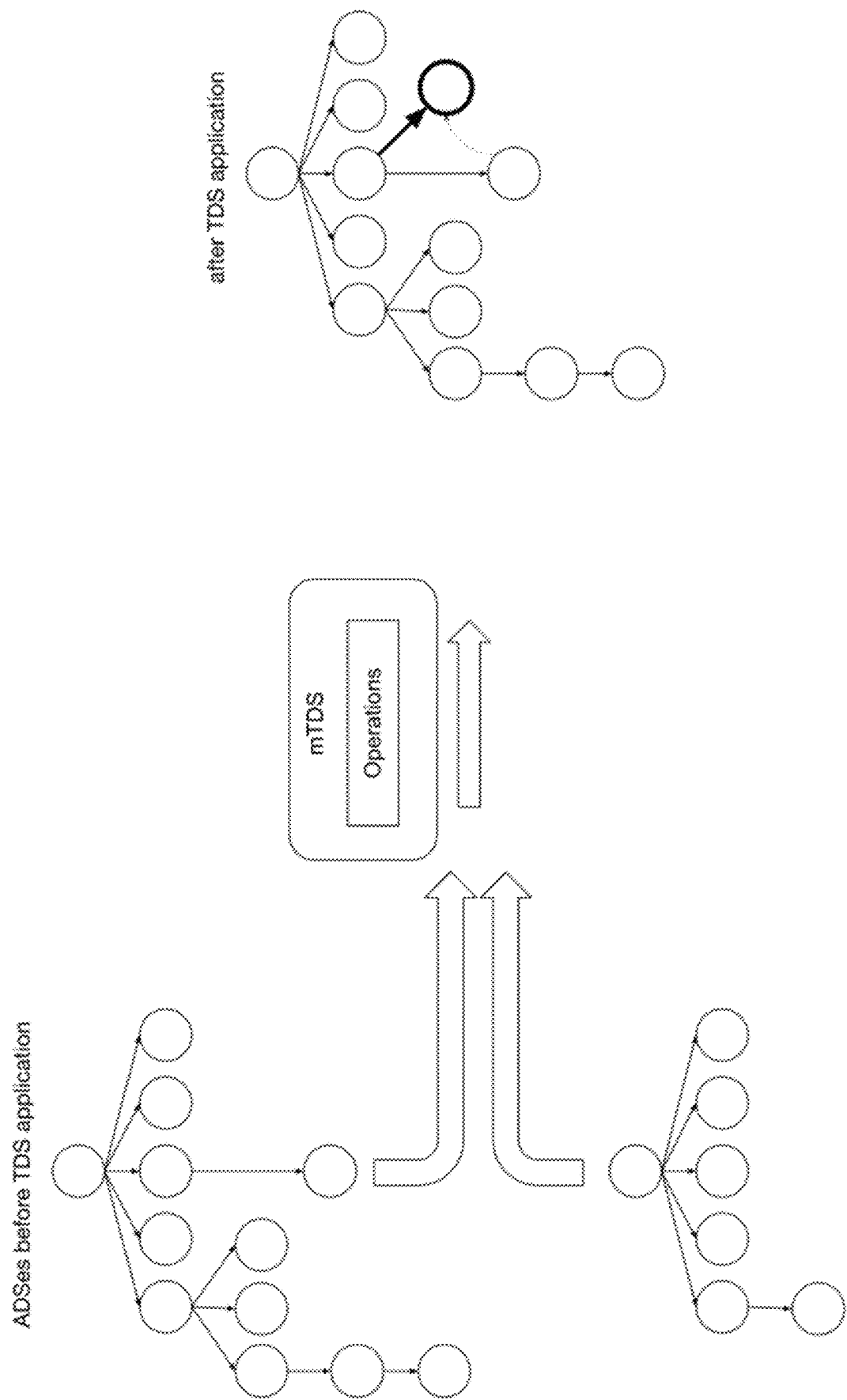
FIG. 17 is diagram illustrating an example of a multi-TDS in accordance with some implementations.

In some implementations, a virtual ADS is computed as an information-reducing summary. For example, an aggregate, virtual ADS may be computed for a geographic area or industry by aggregating known ADSes, with modeling to extrapolate sampled data. In some implementations, a special TDS for multi-ADS calculations is used, which may be referred to as a multi-TDS, or mTDS. mTDSes may be used for aggregation, summarization, or modeling. mTDSes may consume PDSes depending on the implementation and use case. FIG. 17 illustrates a multi-TDS that transforms data from more than one ADS to do aggregation and summarization. For example, a mTDS may transform data from more than one ADS to aggregate data based on one or more characteristics, for example, aggregating ADSes associated with a common industry.

In implementations that must tolerate significant latency or intermittent connectivity of some servers (e.g., 122 or third party servers (not shown) or clients 106a . . . 106n, a synchronizing algorithm in the CDS engine(s) 238 is used to control risk of backtracking and to help the distributed system to synchronize. An example of such an algorithm is a two-phase commit.

Metadata: CAS data structures (e.g., ODS, ADS, TDS, PDS, mTDS, etc.) may contain metadata. Examples of metadata include, but are not limited to, an identifier, description, provide for a timestamp, support validation, reference origin or provenance, history, and/or access rights. In some implementations, encryption and/or other security and/or privacy control mechanisms may be applied.

Figure 18:
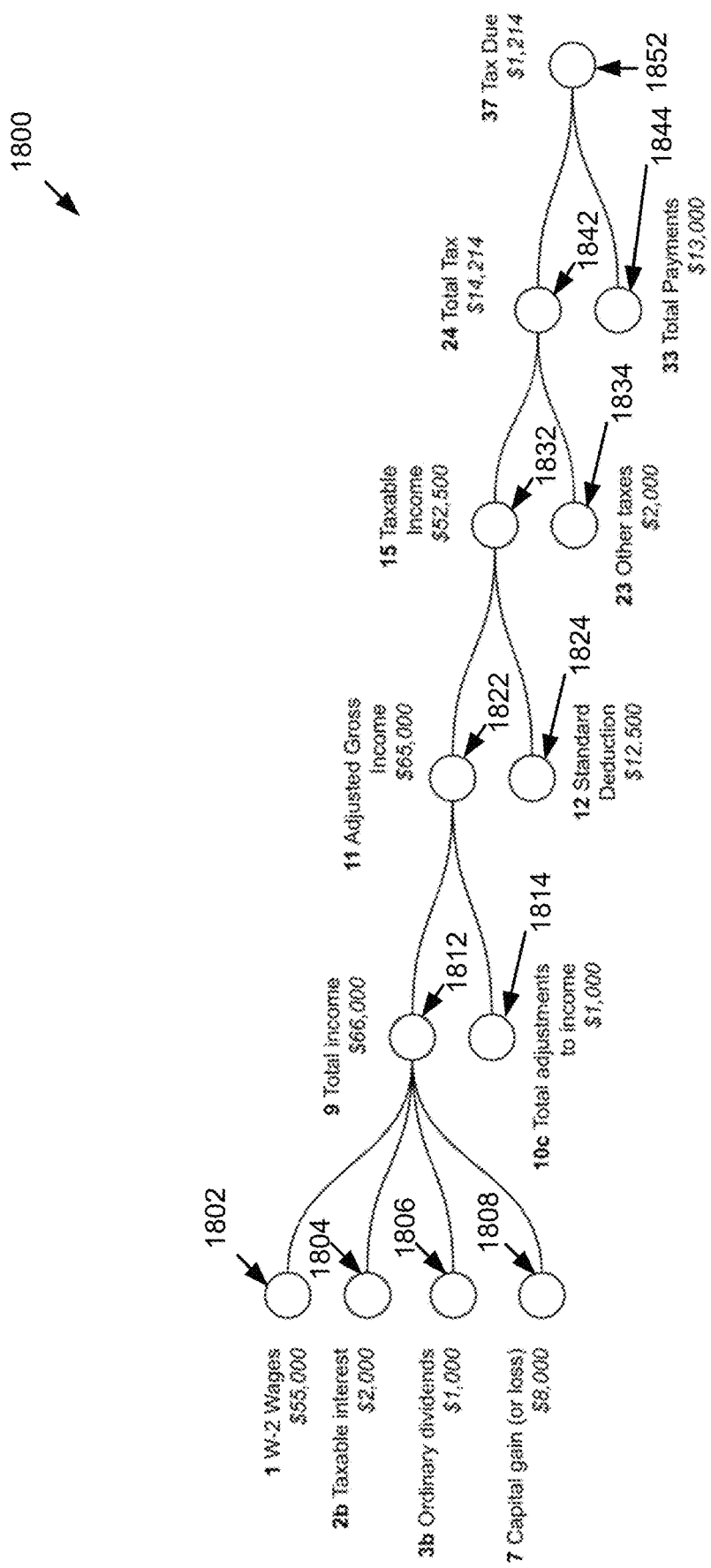
FIG. 18 is a diagram illustrating an example of a tax tree in accordance with some implementations.

Tax Example TDS and PDS output: FIG. 18 is an example of a tree 1800 that is an example of the type of reporting output from a TDS with a PDS that encapsulates a tax form calculation. FIG. 18 is an example of an output from a transform that computes part of a Federal Income Tax Form for individuals according to some implementations. The tree 1800 includes a number of nodes including nodes 1802, 1804, 1806, 1808, 1812, 1814, 1822, 1824, 1832, 1834, 1842, 1844, and 1852. Node 1812 includes an address (i.e., 9), a description (i.e., "Total Income"), and a value (i.e., $66,000, which is a sum of the values associated with nodes 1802, 1804, 1806, and 1808). Node 1852 includes an address (i.e., 37), a description (i.e., "Total Tax"), and a value (i.e., $1,214). Node 1844 includes an address (i.e., 33), a description (i.e., "Total Payments"), and a value (i.e., $13,000). In some implementations, as illustrated, the addresses reference a tax form line number. The illustrated Tax Example uses a PDS that encompasses and encodes the tree for tax calculation a TDS transformation takes the PDS and ADS for an individual and computes FIG. 18.

Example User Interfaces

Figure 19:
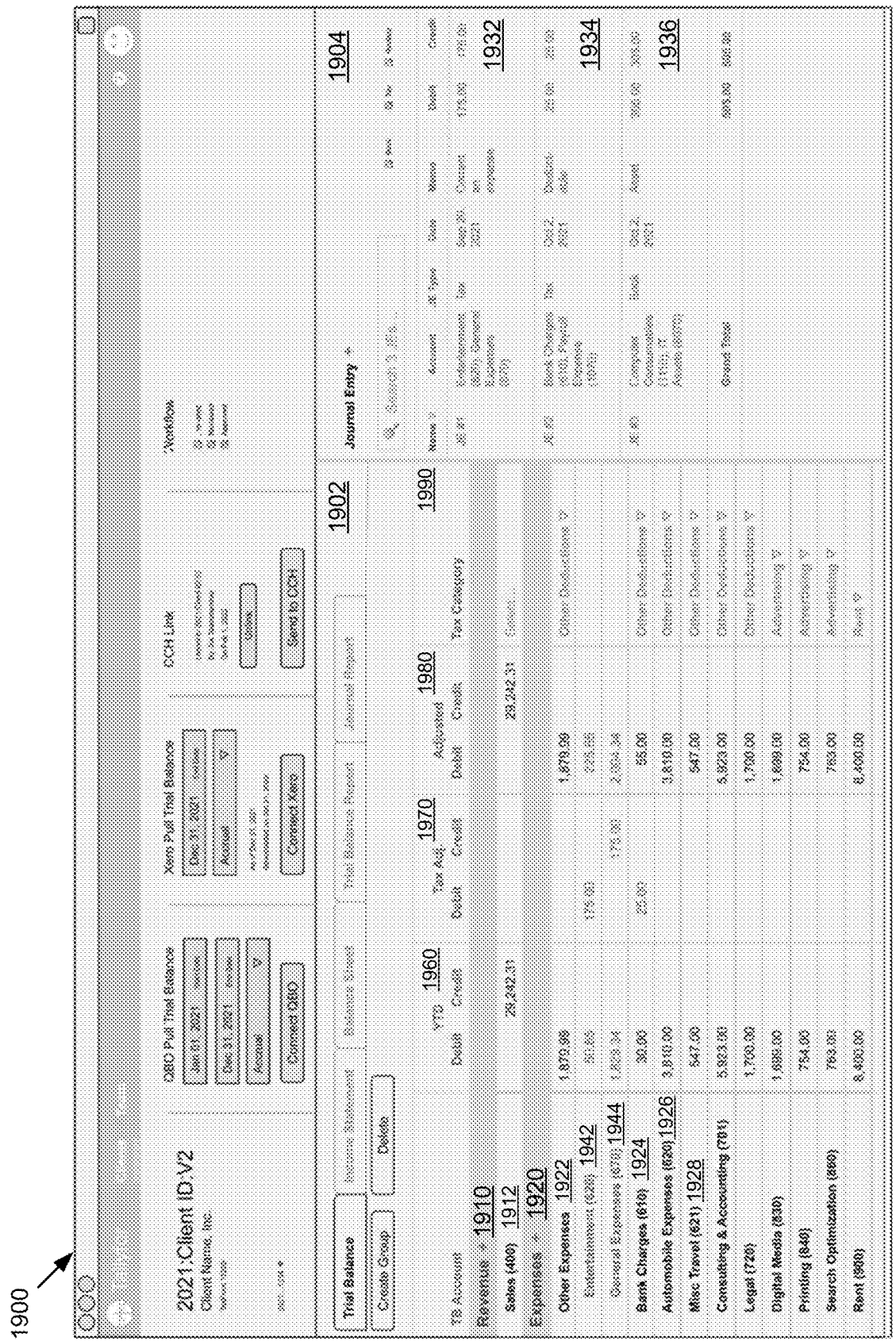
FIG. 19 is a graphic representation of an example user interface generated by the system in accordance with some implementations.

In some implementations, the CAS 220 also generates and presents a number of unique user interfaces. An example user interface 1900 is illustrated FIG. 19. FIG. 19 illustrates an example user interface with instantaneous update between Trial Balance on Left and Journal Entries on Right. Conceptually, the system 100 presents a data panel 1902 (Left) and a applies changes panel 1904 (Right). It should be understood that in some implementations, the order and placement of the panels may vary, e.g., they may be swapped.

In some implementations, the information and data displayed in the UI 1900 are associated with one or more of an ADS, ODS, and a TDS. For example, in some implementations, the data panel 1902 and its associated content is generated based on an ADS. For example, in the illustrated implementation, an ADS associated with Client Name, Inc. is used to populate the data panel 1902. The associated ADS includes nodes (e.g., first tier) associated with Revenue 1910 and Expenses 1920; the sub-nodes (e.g., second tier) associated with Other Expenses 1922, Bank Charges 1924, Automobile Expenses 1926, Misc Travel 1928, etc. depending from the Expenses 1920 node; and sub-sub-nodes (e.g. third tier nodes) associated with Entertainment 1942 and General Expenses 1944 depending from the other expenses 1922 nodes. As another example, in some implementations, the tax categories appearing in column 1990 may be associated with corresponding nodes in the ADS. As yet another example, one or more of the values appearing in columns YTD 1960, Tax Adj. 1970, and Adjusted 1980 may be associated with a node representing the account identified in the left-most column.

In some implementations, the UI data panel 1902, itself, is result of a TDS that transforms from an ADS to a rendering format (i.e., HTML or other format), which is rendered for display as the UI data panel 1902.

In some implementations, the changes panel 1904 is based on one or more of at least one ODS and at least one TDS. For example, as illustrated, the journal entries 1932, 1934, and 1936 are associated with and are generated from three ODSes (not shown). In some implementations, the UI 1900 allows a user to drag and drop information. In some of those implementations, the drag-and-drop may generate a corresponding ODS in the back end, which modifies, or generates a new, ADS, which is then used to regenerate/refresh the information displayed in the UI 1900. In some implementations, the user may edit data displayed in the UI 1900. In some of those implementations, the user's edits information displayed in the UI (e.g., a value in a field), and the system 100 generates an ODS and applies the ODS to the present ADS, which modifies, or generates a new, ADS, which is then used to regenerate/refresh the information displayed in the UI 1900. Accordingly, the CAS system 100 allows for a dynamic account structure and intuitive edits to be implemented, or manipulated, in real-time, while documenting the changes (e.g., in the ODSes), which may be used, for example, as an audit trail, to unwind the state of accounts to a particular date, perform synchronization, etc.

Example Methods

Figure 20:
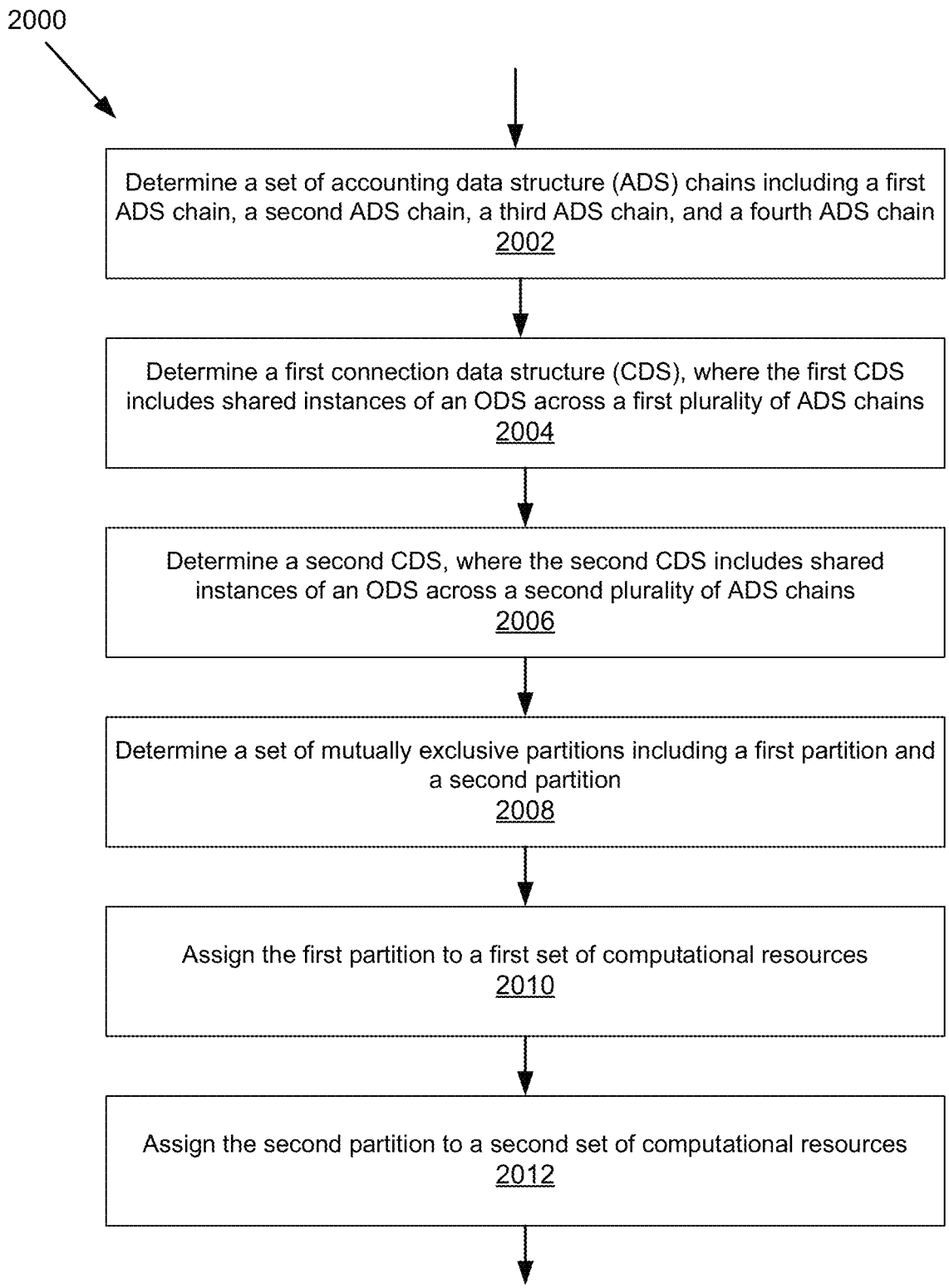
FIG. 20 is a flowchart of an example method for partitioning in accordance with some implementations.
Figure 21:
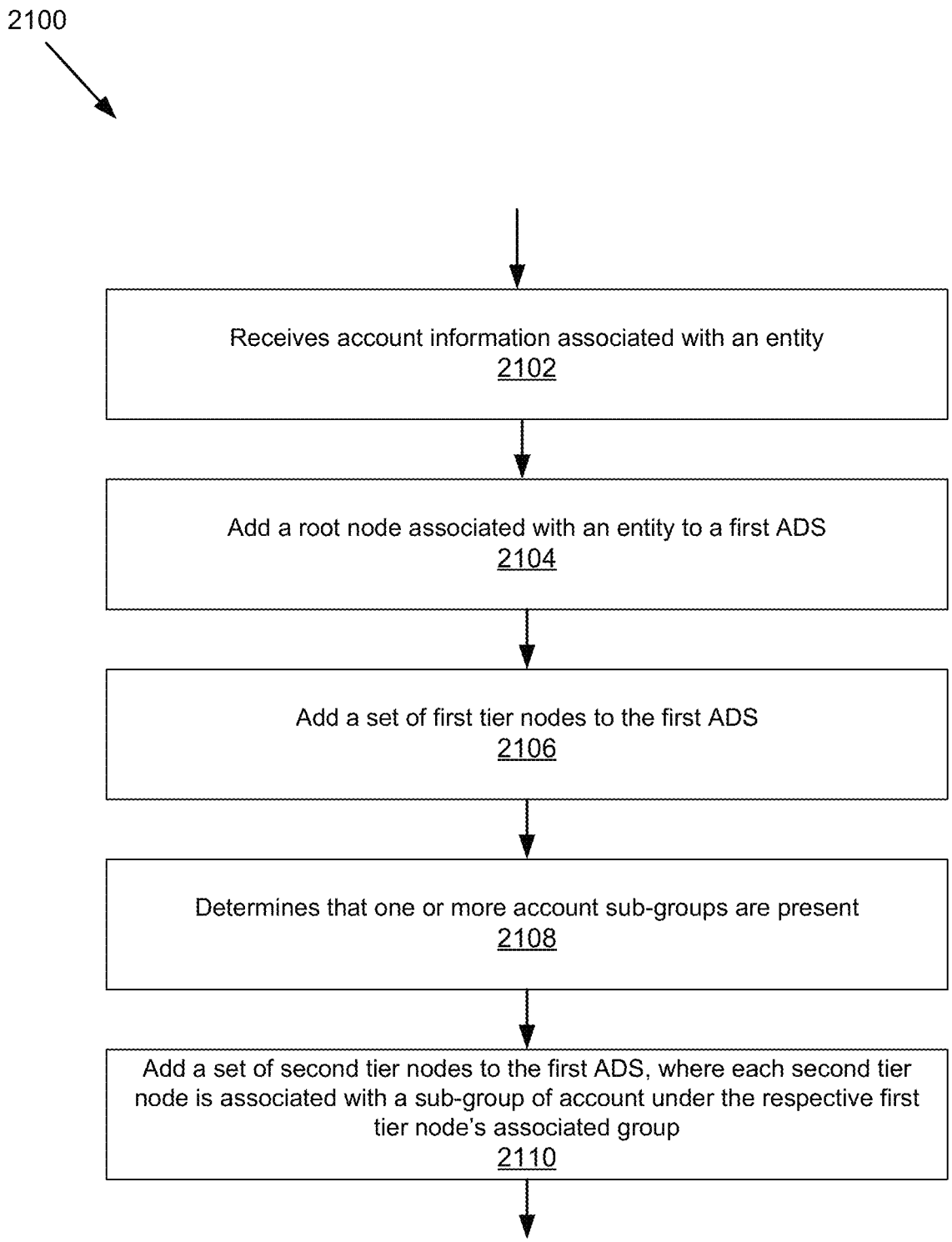
FIG. 21 is a flowchart of an example method for generating an ADS in accordance with some implementations

FIGS. 20-22 are flowcharts of example methods, which may be performed by systems described herein, e.g., in FIGS. 1, 2, and 13, in accordance with some implementations.

FIG. 20 is a flowchart of an example method 2000 for partitioning in accordance with some implementations. At block, 2002, the CAS 220 determines a set of accounting data structure (ADS) chains including a first ADS chain, a second ADS chain, a third ADS chain, and a fourth ADS chain. At block 2004, the CAS 220 determines a first connection data structure (CDS), where the first CDS includes shared instances of an ODS across a first plurality of ADS chains. For example, the first CDS includes a first operation data structure (ODS) associated with a first ADS chain and a second ODS associated with the second ADS chain, wherein the first ODS and second ODS are two instances describing one or more related operations that involve the first ADS chain and the second ADS chain. At block 2006, the CAS 220 determines a second CDS, where the second CDS includes shared instances of an ODS across a second plurality of ADS chains. For example, the second CDS includes a third ODS associated with a third ADS chain and a fourth ODS associated with a fourth ADS chain, wherein the third ODS and the fourth ODS are two instances describing one or more related operations that involve the third ADS chain and the fourth ADS chain. At block 2008, the CAS 220 determines a set of mutually exclusive partitions including a first partition and a second partition. For example, the first ADS chain, the second ADS chain, and the first CDS are associated with the first partition, the third ADS chain, the fourth ADS chain, and the second CDS are associated with the second partition, and the first partition and second partition are mutually exclusive in that no CDS links an ODS in an ADS chain associated with the first partition to an ODS in an ADS chain associated with the second partition. At block 2010, the CAS 220 assigns the first partition to a first set of computational resources, and, at block 2012, the CAS 220 assigns the second partition to a second set of computational resources.

FIG. 21 is a flowchart of an example method 2100 for generating an ADS in accordance with some implementations. At block 2102, the CAS 220 receives account information associated with an entity. At block 2104, the CAS 220 adds a root node associated with an entity to a first ADS. At block 2106, the CAS 220 adds a set of first tier nodes to the first ADS. For example, each of the first tier nodes is associated with a group node selected from income, expenses, assets, liabilities, and equity. At block 2108, the CAS 220 determines that one or more account sub-groups are present, and, at block 2110, the CAS 220 adds a set of second tier nodes to the first ADS, where each second tier node is associated with a sub-group of account under the respective first tier node's associated group.

Other Considerations

The previous description is provided to enable practice of the various aspects described herein. Various modifications to these aspects should be understood, and the generic principles defined herein may be applied to other aspects. Thus, the claims are not intended to be limited to the aspects shown herein but is to be accorded the full scope consistent with the language in the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of blocks in the processes disclosed is an example of illustrative approaches. Based upon design preferences, it is understood that the specific order or hierarchy of blocks in the processes may be rearranged while remaining within the scope of the previous description. The accompanying method claims present elements of the various blocks in a sample order and are not meant to be limited to the specific order or hierarchy presented.

The previous description of the disclosed implementations is provided to enable others to make or use the disclosed subject matter. Various modifications to these implementations should be readily apparent, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the blocks of various examples must be performed in the order presented. As should be appreciated, the order of blocks in the foregoing examples may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, engines, circuits, and algorithm blocks described in connection with the examples disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In some examples, the functions described may be implemented in hardware, software, firmware, or any combination thereof. If implemented in software, the functions may be stored as one or more instructions or code on a non-transitory computer-readable storage medium or non-transitory processor-readable storage medium. The blocks of a method or algorithm disclosed herein may be implemented in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable others to make or use the present disclosure. Various modifications to these examples should be readily apparent, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A computer-implemented method comprising:
   determining, using one or more processors, a set of accounting data structure (ADS) chains including a first ADS chain, a second ADS chain, a third ADS chain, and a fourth ADS chain,
      wherein each ADS chain is associated with an entity;
      wherein an operational data structure (ODS) instance represents an operation that alters an existing ADS, thereby generating an updated ADS representing an updated account structure;
      wherein each ADS chain includes an initial ADS representing a tree-based account structure customized to the entity and associated data at a first time and a repeating pattern of:
         ODS that modifies that existing ADS into a resulting, modified ADS and
         resulting, modified ADS, where the pattern is repeated one or more times; and
      wherein each ADS chain represents a traversable, evolutionary chain of modifications and resulting ADSes associated with the entity across time;
   determining, using the one or more processors, a first connection data structure (CDS), the first CDS comprising a first set of ODS instances shared across a first plurality of ADS chains, the first set of ODS instances including:
      a first operation data structure (ODS) associated with a first ADS chain and
      a second ODS associated with the second ADS chain, wherein the first ODS and second ODS are two ODS instances describing one or more related operations that involve the first ADS chain and the second ADS chain;
   determining, using the one or more processors, a second CDS, the second CDS comprising a second set of ODS instances shared across a second plurality of ADS chains, the second set of ODS instances including:
      a third ODS associated with a third ADS chain and
      a fourth ODS associated with a fourth ADS chain, wherein the third ODS and the fourth ODS are two ODS instances describing one or more related operations that involve the third ADS chain and the fourth ADS chain;
   determining, using the one or more processors, a set of mutually exclusive partitions including a first partition and a second partition, wherein the first ADS chain, the second ADS chain, and the first CDS are associated with the first partition, wherein the third ADS chain, the fourth ADS chain, and the second CDS are associated with the second partition, wherein the first partition and second partition are mutually exclusive in that no CDS links an ODS in an ADS chain associated with the first partition to an ODS in an ADS chain associated with the second partition;
   assigning, using the one or more processors, the first partition to a first set of computational resources; and
   assigning, using the one or more processors, the second partition to a second set of computational resources.

2. The computer-implemented method of claim 1, wherein the first ADS chain includes a first ADS and a second ADS, wherein the first ADS and second ADS are hierarchical tree structures.

3. The computer-implemented method of claim 2, wherein the method further comprises:
   generating the first ADS, wherein the first ADS is a hierarchical tree structure, and generating the first ADS includes:
      receiving account information associated with an entity;
      adding a root node associated with an entity to the first ADS;
      adding a set of first tier nodes to the first ADS, wherein each of the first tier nodes is associated with a group node selected from income, expenses, assets, liabilities, and equity; and
      when one or more account sub-group are present, adding a set of second tier nodes to the first ADS, wherein each second tier node is associated with a sub-group of account under the respective first tier node's associated group.

4. The computer-implemented method of claim 2, wherein each node in the first ADS is associated with a value and a sum of leaf nodes in the first ADS, when the first ADS is balanced, is equal to zero.

5. The computer-implemented method of claim 2, wherein the first ODS is applied to the first ADS and results in the second ADS, the first ODS changing one or more of a node and data associated with a node in the first ADS and the first ODS is associated with a financial transaction involving an entity associated with the first ADS chain and an entity associated with the second ADS chain.

6. The computer-implemented method of claim 2, wherein the method further comprises:
   applying a transformation data structure (TDS) to the second ADS; and
   outputting, responsive to application of the TDS to the second ADS, one or more of a third ADS and a report.

7. The computer-implemented method of claim 6, wherein the TDS is associated with a closing and invokes one or more parameter data structures.

8. The computer-implemented method of claim 1, wherein the method further comprises:
   generating a parameter data structure (PDS) stream including one or more parameter data structures, the first CDS and the second CDS further including at least one PDS from the PDS stream.

9. The computer-implemented method of claim 8, wherein a first PDS in the PDS stream represents one or more of time, a tax rate, a tax table, tax calculations, transaction fees or other published prices, and a currency exchange rate.

10. The computer-implemented method of claim 1, wherein the second ADS chain comprises a first, virtual ADS and a second, virtual ADS, the first virtual ADS generated responsive to a determination that an ADS associated with a second entity is not accessible or does not already exist, the second ODS applied to the first, virtual ADS thereby generating the second, virtual ADS.

11. A system comprising:
one or more processors;
a memory storing instructions that, when executed by the one or more processors, cause the system to perform operations comprising:
determine a set of accounting data structure (ADS) chains including a first ADS chain, a second ADS chain, a third ADS chain, and a fourth ADS chain, wherein each ADS chain is associated with an entity;
wherein an operational data structure (ODS) instance represents an operation that alters an existing ADS, thereby generating an updated ADS representing an updated account structure;
wherein each ADS chain includes an initial ADS representing a tree-based account structure customized to the entity and associated data at a first time and a repeating pattern of:
ODS that modifies that existing ADS into a resulting, modified ADS and
resulting, modified ADS, where the pattern is repeated one or more times; and
wherein each ADS chain represents a traversable, evolutionary chain of modifications and resulting ADSes associated with the entity across time;
determine a first connection data structure (CDS), the first CDS comprising a first set of ODS instances shared across a first plurality of ADS chains, the first set of ODS instances including:
a first operation data structure (ODS) associated with a first ADS chain and
a second ODS associated with the second ADS chain, wherein the first ODS and second ODS are two ODS instances describing one or more related operations that involve the first ADS chain and the second ADS chain;
determine a second CDS, the second CDS comprising a second set of ODS instances shared across a second plurality of ADS chains, the second set of ODS instances including:
a third ODS associated with a third ADS chain and
a fourth ODS associated with a fourth ADS chain, wherein the third ODS and the fourth ODS are two ODS instances describing one or more related operations that involve the third ADS chain and the fourth ADS chain;
determine a set of mutually exclusive partitions including a first partition and a second partition, wherein the first ADS chain, the second ADS chain, and the first CDS are associated with the first partition, wherein the third ADS chain, the fourth ADS chain, and the second CDS are associated with the second partition, wherein the first partition and second partition are mutually exclusive in that no CDS links an ODS in an ADS chain associated with the first partition to an ODS in an ADS chain associated with the second partition;

assign the first partition to a first set of computational resources; and
assign the second partition to a second set of computational resources.

12. The system of claim 11, wherein the first ADS chain includes a first ADS and a second ADS, wherein the first ADS and second ADS are hierarchical tree structures.

13. The system of claim 12, wherein the instructions, when executed by the one or more processors, further cause the system to:
generate the first ADS, wherein the first ADS is a hierarchical tree structure, and generating the first ADS includes:
receiving account information associated with an entity;
adding a root node associated with an entity to the first ADS;
adding a set of first tier nodes to the first ADS, wherein each of the first tier nodes is associated with a group node selected from income, expenses, assets, liabilities, and equity; and
when one or more account sub-group are present, adding a set of second tier nodes to the first ADS, wherein each second tier node is associated with a sub-group of account under the respective first tier node's associated group.

14. The system of claim 12, wherein each node in the first ADS is associated with a value and a sum of leaf nodes in the first ADS, when the first ADS is balanced, is equal to zero.

15. The system of claim 12, wherein the first ODS is applied to the first ADS and results in the second ADS, the first ODS changing one or more of a node and data associated with a node in the first ADS and the first ODS is associated with a financial transaction involving an entity associated with the first ADS chain and an entity associated with the second ADS chain.

16. The system of claim 12, wherein the instructions, when executed by the one or more processors, further cause the system to:
apply a transformation data structure (TDS) to the second ADS; and
output, responsive to application of the TDS to the second ADS, one or more of a third ADS and a report.

17. The system of claim 16, wherein the TDS is associated with a closing and invokes one or more parameter data structures.

18. The system of claim 11, wherein the instructions, when executed by the one or more processors, further cause the system to:
generating a parameter data structure (PDS) stream including one or more parameter data structures, the first CDS and the second CDS further including at least one PDS from the PDS stream.

19. The system of claim 18, wherein a first PDS in the PDS stream represents one or more of time, a tax rate, a tax table, tax calculations, transaction fees or other published prices, and a currency exchange rate.

20. The system of claim 11, wherein the second ADS chain comprises a first, virtual ADS and a second, virtual ADS, the first virtual ADS generated responsive to a determination that an ADS associated with a second entity is not accessible or does not already exist, the second ODS applied to the first, virtual ADS thereby generating the second, virtual ADS.

* * * * *